United States Patent [19]

Kluger et al.

[11] Patent Number: 5,082,938

[45] Date of Patent: Jan. 21, 1992

[54] ORGANIC MATERIALS CONTAINING POLY(OXYALKYLENE) MOIETIES HAVING ENHANCED FUNCTIONALITY AND THEIR PREPARATION

[75] Inventors: Edward W. Kluger, Pauline; David J. Moody, Spartanburg, both of S.C.

[73] Assignee: Milliken Research Corporation, Spartanburg, S.C.

[21] Appl. No.: 486,992

[22] Filed: Mar. 1, 1990

[51] Int. Cl.$^5$ .................. C07C 211/46; C07C 217/28
[52] U.S. Cl. ....................................... 544/38; 544/102;
544/105; 546/95; 546/100; 546/165; 546/312;
548/141; 548/444; 548/478; 548/491; 548/509;
549/68; 564/86; 564/275; 564/299; 564/310;
564/391; 564/428; 564/433; 564/441; 564/442;
564/443; 568/337; 568/587
[58] Field of Search ............... 564/443, 86, 275, 299,
564/310, 391, 428, 433, 441, 442; 544/38, 102,
105; 546/19, 165, 312; 548/193, 444, 491, 509;
549/68

[56] References Cited

U.S. PATENT DOCUMENTS

| | | | |
|---|---|---|---|
| 3,154,535 | 10/1964 | Graham, Jr. | 260/198 |
| 3,157,633 | 11/1964 | Kuhn | 260/200 |
| 3,446,757 | 5/1969 | Wandenberg | 260/2 |
| 3,535,382 | 10/1970 | Brown et al. | 260/575 |
| 3,945,894 | 3/1976 | Martin et al. | 204/55 R |
| 4,086,151 | 4/1978 | Stevens et al. | 204/159.16 |
| 4,298,764 | 11/1981 | Berkowitz | 568/618 |
| 4,594,454 | 6/1986 | Moore et al. | 564/443 |
| 4,659,774 | 4/1987 | Webb et al. | 525/54.2 |
| 4,751,254 | 6/1988 | Kluger et al. | 521/163 |
| 4,761,502 | 8/1988 | Kluger et al. | 564/442 |
| 4,812,141 | 3/1989 | Baumgartner et al. | 8/506 |
| 4,877,411 | 10/1989 | Hines et al. | 8/403 |

OTHER PUBLICATIONS

Vandenberg, E. J., "Polymerization of Glycidol and Its Derivatives: A New Rearrangement Polymerization", *Journal of Polymer Science: Polymer Chemistry Edition*, vol. 23, 915–949 (1985).

*Primary Examiner*—Richard L. Raymond
*Attorney, Agent, or Firm*—Timothy J. Monahan; H. William Petry

[57] ABSTRACT

Enhanced branched chain hydroxyl compounds are provided of formula $$Y-(Z)_{1-6}$$

wherein Y is the residue of a nucleophile devoid of conjugated divalent linking moieties, and each Z is a poly(oxyalkylene) moiety having a molecular weight of from about 200–10,000 and containing at least one glycidol residue, wherein at least one of the primary oxy sites of said glycidol residue is linked preferably directly to a first epoxide residue of three or more carbons, and wherein said first epoxide residue is linked through a secondary oxy site preferably directly to a second epoxide reside having a primary terminal hydroxyl.

12 Claims, No Drawings

ORGANIC MATERIALS CONTAINING POLY(OXYALKYLENE) MOIETIES HAVING ENHANCED FUNCTIONALITY AND THEIR PREPARATION

This invention concerns organic materials containing at least one poly(oxyalkylene) moiety having altered and improved molecular structure contributing to one or more characteristics of enhanced functionality such as higher density hydroxyl distribution, increased branching and branching density, more uniform branch chain lengths, or the like, which characteristics appear to contribute to improved reactivity and/or compatibility of the present materials in polymeric substrates, as well as improvements in other properties such as non-extractibility from such substrates. Such molecular alterations are most significant in modifying the properties of organic compounds containing reactive nucleophiles consisting of or derived from primary and secondary amines, hydroxyl, mercapto, sulfinic acids, sulfonamides, imides or sulfoic imides, or the like.

Certain utilities for the present improved materials, e.g., for the preparation of colorants for polymeric substrates, are further disclosed in Applicant's commonly assigned, copending patent application Ser. No. 07/461,852, filed Jan. 8, 1990, the disclosure of which is incorporated herein by reference.

Multi-functional materials such as compounds containing poly(oxyalkylene) moities having a plurality of hydroxyls, primary and/or secondary, are described, for example, in U.S. Pat. Nos. 3,535,382, 4,761,502; 3,154,535; 4,298,764; 4,659,774; 4,751,254; 3,446,757; 4,086,151; 4,284,729; and 3,945,894. The utility and process disclosures of these patents concerning entry of the multi-functional materials into polymeric or resinous substrates are incorporated herein by reference. Also, the production of primary and secondary hydroxyls through the base catalyzed, polymerization of glycidol with limited branch chain production is described in the Journal of Polymer Science, Vol. 23, pages 915–949 (1985), E. J. Vandenberg.

It is noted that in these prior disclosures, the epoxide chain propagation both branched and unbranched, proceed according to the natural polymerization tendencies of the epoxide reactant, without further directive influence. As a result and as more clearly perceived through theoretical considerations, the degree of branching is thus limited and chain propagation appears to proceed principally from primary hydroxyl nucleophilic sites, producing long, unbranched chains. Such limited branching, particularly where the residual functional sites are distributed in a low density pattern, appear to have a restricting effect on the propensity of the poly(oxyalkylene) moiety to affix itself, either chemically or physically by molecular intertwining to substrates such as polymers or the like.

The present invention has as a principal object therefore, to provide a process and product, whereby a positive directive influence is brought to bear on such epoxide polymerizations to effect the aforesaid molecular improvements, especially the apparent branching and functional density enhancements, and particularly where the branched segments are ultimately terminated by primary hydroxyls.

This and other objects hereinafter appearing have been attained in accordance with the present invention through the discovery of a process and product therefrom, which process provides the aforementioned directive influence on the epoxide polymerizations, the process comprising the steps of (1) providing a reaction system containing an initial reactant having at least one glycidol component comprised of at least one glycidol residue and containing at least one primary hydroxyl and at least one secondary hydroxyl, and (2) contacting said reaction system with epoxide reactant material comprised of from about five mole percent to about 95 mole percent of a secondary hydroxyl producing epoxide of three or more carbons, and conversely from about 95 mole percent to about five mole percent of a primary hydroxyl producing epoxide, the addition of said reactant material being in a selective sequence to (a) firstly produce at least one secondary hydroxyl containing epoxide residue segment either linked directly to at least one primary oxy site on said glycidol component or to an intermediate epoxide residue segment of up to about ten epoxide residues linked directly to said oxy site, and (b) secondly to terminate at least a major portion of the resulting poly(oxyalkylene) chains or branches with primary hydroxyl groups.

In certain preferred embodiments of the above process:

(a) in step (2) said reaction system is first contacted in a step (2a) with a first epoxide reactant of at least three carbons in stoichiometric excess of at least a major portion of total primary hydroxyl in said glycidol component, and the resulting reaction system is then contacted in a step (2b) with a second epoxide reactant which produces primary hydroxyls, the amount of said second epoxide reactant added being in stoichiometric excess of at least a major portion of total hydroxyls in the product of step (2a);

(b) in steps (2a) and (2b) the first and second epoxide reactants respectively are added in stoichiometric excess of the total hydroxyl present in said reactant from step (1) and in the poly(oxyalkylene) moiety from step (2a);

(c) the molar ratio of each of said first and second epoxide reactants to total glycidol residues is from about 1/1 to about 60/1;

(d) said glycidol component is directly bonded to the reactive site of a nucleophile selected from organic primary or secondary amine, hydroxy, mercapto, sulfinic acid, sulfonamide, imide or sulfoic imide compounds;

(e) said glycidol component contains two to eight glycidol residues;

(f) said first epoxide reactant is propylene oxide or butylene oxide or mixtures thereof, and said second epoxide reactant is ethylene oxide; and (g) said glycidol component is directly bonded to a nucleophilic site of a reactant derived from: substituted or unsubstituted anilines; 1,2,3,4-tetrahydroquinolines; 3,4-dihydro-2H-1,4-benzoxazines; 2-aminothiazoles; indoles; 2,3-dihydroindoles; carbazoles; naphthylamines; phenoxazines; phenothiazines; diphenylamines; julolidines; 2-aminothiophenes; or aminopyridines.

It is believed that the present molecular improvements results from the diminishment of reactivity disparity between the available primary and secondary hydroxyls of the glycidol component through conversion of at least some of the initial primary hydroxyls thereof to secondary hydroxyls by means of the initial reaction with the first epoxide reactant, which reaction theoretically occurs more readily at primary hydroxyl sites. The secondary hydroxyls originally present or formed by this first reaction thus have diminished competition from primary hydroxyls for reaction with subsequent first and second epoxide reactants. Consequently, the possibility for unlimited, single, unbranched chain propagation from primary hydroxyl sites is markedly reduced. It is noted that the present process appears to distribute reactive hydroxyl functionality in the final product in a more dense spatial relationship than heretofore attainable, for subsequent and improved reaction with polymeric reactants or the like.

The present improved materials find special utility, e.g., as reactive intermediates for the manufacture of various organic moieties such as, e.g., organic colorants for incorporating by reaction or blending as aforesaid into polymeric substrates. Such incorporation into polyurethanes is described in detail in the aforesaid U.S. Pat. No. 4,284,729. Also, the present materials find utility as aqueous dispersion aids in a variety of systems, or for reactive incorporation into compounds for markedly increasing the water dispersibility thereof. In the use of poly(oxyalkylene) materials, particularly as reactive intermediates, the degree of chain branching, the positions of the functional sites on the poly(oxyalkylene) moiety and their molar concentrations thereon, and the ratio of their primary/secondary character can become quite important, particularly in regard to the permanancy and non extractibility with which these intermediates can chemically or physically affix various moieties, such as colorants, into various polymeric substrates.

In its broad aspect, the present intermediates prepared as above described are defined as having the formula

wherein Y is the residue of a nucleophile devoid of conjugated divalent linking moieties, and each Z is a poly(oxyalkylene) moiety containing at least one glycidol residue segment containing at least one glycidol residue, wherein at least one of the primary oxy sites of said glycidol segment is linked directly to a first epoxide segment containing at least one residue of an epoxide of three or more carbons, wherein in said first epoxide segment said epoxide residue of three or more carbons is either directly linked to said glycidol segment at said primary oxy site or is positioned in said segment within about ten epoxide residues of said primary oxy site, said first epoxide segment being linked through a secondary oxy site directly to a second epoxide segment containing at least one epoxide residue having a primary terminal hydroxyl, and wherein at least one secondary hydroxyl of said glycidol residue segment is linked directly to either said first epoxide segment of said second epoxide segment.

As stated in a more limited embodiment, each Z is a poly(oxyalkylene) moiety containing at least one polyglycidol segment of at least two glycidol residues, said polyglycidol segment being directly linked to a terminating moiety containing a first epoxide segment comprised of (a) the residue of one or more epoxide reactants of three or more carbons, and (b) a second epoxide segment directly linked to said first epoxide segment and comprised of the residue of one or more epoxide reactants and containing at least one primary terminal hydroxyl.

The above Z moieties can vary in molecular weights, for example, from about 200 to about 10,000, depending on the use intended for these reactive materials products. The Z moieties in another preferred embodiment contain in close proximity to the nucleophile a segment of at least two linked glycidol residues, which segment has been reacted with propylene oxide or butylene oxide in stoichiometric excess of the glycidol residue hydroxyl sites, and wherein the resultant product is reacted with ethylene oxide reactant to provide at least two terminal —$CH_2CH_2OH$ groups. It is also preferred that in the Z moiety the glycidol residues comprise at least about 0.5 mole percent of all epoxide residues, preferably from about 2.0 to about 30.0 mole percent, and most preferably from about 8.0 to about 22.0 mole percent.

Inherent in the above described process and composition is the optional provision for reacting one or more additional glycidol molecules into the Z poly(oxyalkylene) moiety at sites separated from the initial glycidol residue segment. In this event, it is preferred that the additional glycidol residue be subsequently reacted with one or more molecules of a secondary hydroxyl providing epoxide, and that the product thereof subsequently be reacted with one or more molecules of a primary hydroxyl providing epoxide such as ethylene oxide.

In certain other preferred embodiments:

(a) the glycidol residue segment is linked directly to a nitrogen linked directly to an aromatic compound;

(b) the glycidol residue segment is connected directly to an aromatic compound through or by an oxy, thio, sulfinyl, sulfonamido or imido linkage;

(c) the glycidol residue segment is comprised of from two to eight linked glycidol residues;

(d) the segment of (c) is directly linked to at least two terminating moieties;

(e) each terminating moiety is comprised of a first segment of one or more linked residues of propylene oxide (PO) or butylene oxide (BO) or mixtures thereof bonded directly to the segment of (d), and of a second segment bonded directly to said first segment and containing one or more linked residues of ethylene oxide (EO); and (f) the first segment of each terminating moiety of (e) contains a total of from about 2 to about 15 residues of PO, BO, or mixtures thereof, and the second segment contains from about 2 to about 50 residues of EO.

It is noted that substantial difficulty is encountered in reacting conventional hydroxyl containing poly(oxyalkylene) compounds, containing a low amount of chain branching, with a wide variety of thermosetting resin systems e.g., toluene diisocyanate for incorporation thereof into a polyurethane substrate. For such purpose, the present invention provides a means for enhancing the hydroxyls present in the chains and thus markedly enhancing the reactivity of the intermediate or a colorant derived therefrom with toluene diisocyanate or other such reactant to greatly increase the permanency of the colorant in the substrate. While this enhanced chain branching would appear to be straightforward through reaction of a compound containing glycidol residues with ethylene oxide, it has been found that with this reactant an unacceptably high proportion of unbranched hydroxyls remain in the intermediate or colorant and result in diminished permanency of the colorant moiety in the substrate. As aforesaid, this diminished permanency is especially noticeable in the case of higher concentrations of intermediate or intermediate derived colorant which can migrate from the substrate polymer and transfer to rugs, furniture, or the like.

The intermediates are those compounds wherein Y is a nucleophilic residue derived from primary or secondary amines, hydroxyl compounds, mercapto compounds, sulfinic acids, sulfonamides, imides or sulfoic imides.

More specific intermediates are those compounds wherein Y is derived from a nucleophile selected from those of the formulae

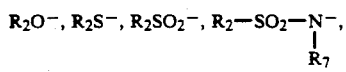

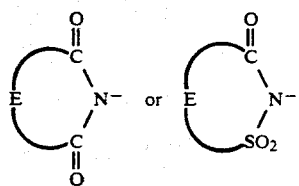

wherein each $R_2$ is selected from hydrogen, substituted or unsubstituted alkyl of 1-20 carbons, substituted or unsubstituted aryl of 6-10 ring carbons, substituted or unsubstituted cycloalkyl of 5-7 ring carbons, and E comprises a divalent ring moiety.

Perferred intermediates are compounds wherein Y is the residue of a reactant selected from substituted or unsubstituted anilines; 1,2,3,4-tetrahydroquinolines; 3,4-dihydro-2H-1,4-benzoxazines; 2-aminothiazoles; indoles; 2,3-dihydroindoles; carbazoles; naphthylamines; phenoxazines; phenothiazines; diphenylamines; julolidines; 2-aminothiophenes or aminopyridines.

A preferred group of intermediates of the invention according to the above general formula are those compounds selected from the formulae

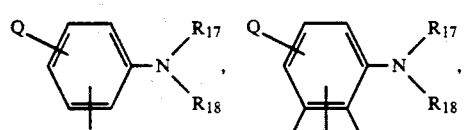

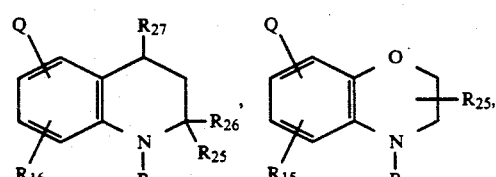

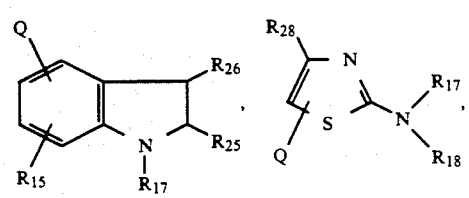

-continued

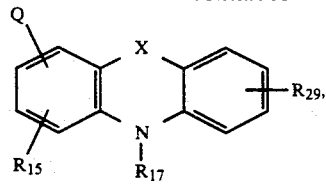

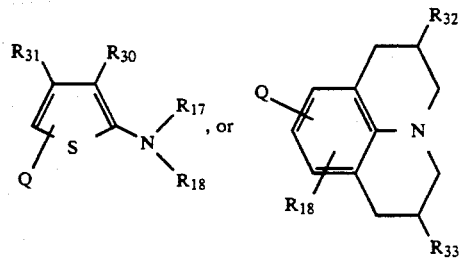

wherein:
Q is selected from: hydrogen; —N=O; —NH$_2$; —NH—NH$_2$; NO$_2$; COR$_5$ wherein R$_5$ is selected from hydrogen, unsubstituted or substituted alkyl, cycloalkyl, or aryl; N$_2$+X$^-$ wherein X$^-$ is a counterion; —N=CH—R$_6$ wherein R$_6$ is selected from alkyl, cycloalkyl or aryl; or —CH=N—R$_6$;

R$_{16}$ is hydrogen or 1-2 substituents selected from lower alkyl, trifluoromethyl, lower alkoxy, arylthio, aryloxy, halogen, —CH$_2$—O—Z or —O—alkylene—O—Z;

R$_{17}$ and R$_{18}$ are each independently selected from —Z; straight or branched lower alkenyl; cycloalkyl; cycloalkyl substituted with hydroxy, alkoxy, alkyl, halogen or alkanoyloxy; phenyl; phenyl substituted with one or more groups selected from lower alkyl, lower alkoxy, cyano, alkanoyloxy or —L—Z; straight or branched chain alkyl of 1-12 carbons and such alkyl substituted with one or more of

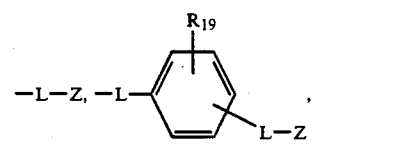

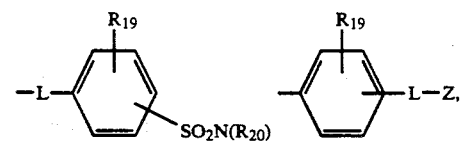

cyano, halogen, 2-pyrrolidino, phthalimidino, vinylsulfonyl, acrylamido, o-benzoic sulfimido, a group of the formula

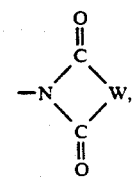

phenyl or phenyl substituted with lower alkyl, lower alkoxy, halogen, carbalkoxy, cyano, carboxy or acyloxy;

R₁₉ is selected from hydrogen, lower alkyl, or lower alkanoylamino, lower alkoxy, halogen;

R₂₀ is selected from hydrogen; lower alkyl; lower alkyl substituted with hydroxy, acyloxy, phenyl, cycloalkyl, halogen or alkoxy; cycloalkyl; phenyl; phenyl substituted with lower alkyl, lower alkoxy, halogen, hydroxy, alkanoylamino, carbalkoxy, carboxy, cyano, or alkanoyloxy;

wherein the alkyl group represented by R₁₇ and R₁₈ can be further substituted with a group selected from those of the formulae: —O—R₂₁; —SO₂—R₂₂; —CON(R₂₁)R₂₃; —SO₂N(R₂₁)R₂₃; —N(R₂₁)SO₂R₂₂; —OCO₂R₂₃; —OCON(R₂₁)R₂₃; —SR₂₄ or —SO₂CH₂CH₂SR₂₄;

wherein R₂₁ and R₂₃ are selected from hydrogen; lower alkyl; lower alkyl substituted with hydroxy, aryloxy, halogen, cycloalkyl or phenyl; cycloalkyl; phenyl; phenyl substituted with lower alkyl, lower alkoxy, halogen, hydroxy, alkanoylamino, carbalkoxy, carboxy, cyano or alkanoyloxy;

R₂₂ represents the same substituents listed for R₂₁ and R₂₃ excepting hydrogen;

R₂₄ is selected from a group listed above for R₂₁ and R₂₃ plus benzothiazol-2-yl, benzimidazol-2-yl, pyridyl, pyrimidinyl, 1,3,4-thiadiazolyl, 1,3,4-oxadiazolyl, naphthyl or triazolyl;

R₂₅, R₂₆, and R₂₇ are independently selected from hydrogen or lower alkyl;

R₂₈ is hydrogen, cycloalkyl, alkyl, 2-thienyl, phenyl, phenyl substituted with halogen, lower alkyl, or lower alkoxy;

R₂₉ is hydrogen or 1-2 substituents selected from lower alkyl, lower alkoxy or halogen;

R₃₀ is selected from cyano, carbalkoxy, alkylsulfonyl, arylsulfonyl or unsubstituted or substituted carbamoyl;

R₃₁ is hydrogen, lower alkyl or aryl;

R₃₂ and R₃₃ are independently selected from hydrogen, lower alkyl, lower alkoxy, halogen or —L—Z;

W is selected from lower alkylene of 1-3 carbons; lower alkylene substituted with hydroxy, halogen, alkoxy or acyloxy; vinyl; 1,2-phenylene; 1,2-phenylene substituted with lower alkyl, lower alkoxy halogen, carboxy or carbalkoxy; 1,2-cyclohexylene; —O—CH₂—; —CH₂OCH₂—; —SCH₂—; —N(R₂₁)CH₂—; —N(R₂₁)CH₂CH₂—; or —CH₂N(R₂₁)CH₂—;

X is selected from a covalent bond, oxygen, or sulfur;

L is selected from X, —SO₂—, —SO₂N(R₂₁)—, —N(SO₂R₂₂)—, —N(R₂₁)—, —COO—, or —CON(R₂₁)—;

and with the proviso that the compound contain at least one —Z moiety.

Additional preferred intermediates of the invention are those compounds selected from the formulae

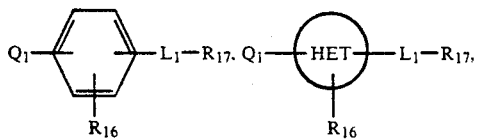

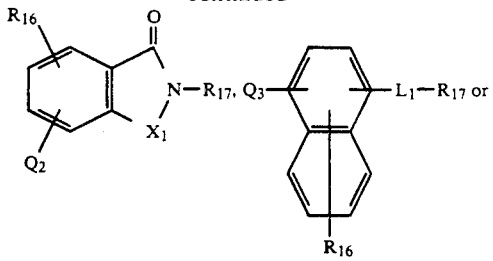

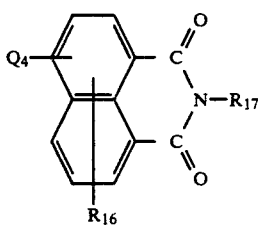

Q₁, Q₂, Q₃, and Q₄ are selected from hydrogen, nitro, amino, hydrazino, or a diazonium salt moiety;

HET is an aromatic radical derived from benzothiazole; thiazole; 1,3,4-thiadiazole; 1,2,4-thiadiazole; pyridine; thiophene or 2,1-benzisothiazole.

L₁ is a linking moiety selected from —O—, —S—, —SO₂—, —N(R₃)—, —SO₂N(R₃)—, or —N(SO₂R₄)—, wherein R₃ is selected from hydrogen, —Z, or an unsubstituted or substituted group selected from alkyl, aryl, cycloalkyl, and R₄ is an unsubstituted or substituted group selected from alkyl, aryl or cycloalkyl.

X₁ is selected from —C(=O)—, —SO₂—, or —S—.

In all of the above alkyl, alkylene, alkoxy, and the like groups or moieties which are or which contain aliphatic hydrocarbon components, said groups or moieties contain 1 to 12 unsubstituted or substituted carbons unless otherwise specified. Also, the term cycloalkyl includes 5-7 membered cycloaliphatic groups and the term aryl includes unsubstituted or substituted carbocyclic and heterocyclic aromatic groups containing from 2-14 carbons.

The highly branched intermediates of the invention are prepared in three steps. In the first step, a nucleophile is hydroxyalkylated by the reaction with glycidol at about 80°-150° C. to give a intermediate having both primary and secondary hydroxyls. Useful nucleophiles are primary or secondary amines, hydroxy compounds, mercapto compounds, sulfinic acids, sulfonamides, imides or sulfoic imides.

The glycidol is added in the presence of an inert gas such as nitrogen until the desired amount of glycidol is reacted. This base catalyzed reaction is carried out with or without solvents. If solvents are desired, toluene, xylenes, nitrobenzene, dioxane are representive solvents that may be used. Exemplary of the useful base catalysts are potassium hydroxide, lithium hydroxide, calcium hydroxide, and barium hydroxide. The amount of basic catalyst can vary but is usually in the range of from about 0.05 percent to about 2 percent by weight. In addition, certain tertiary organic amines are useful catalysts, such as dimethylaminocyclohexane, triethylamine, and benzyldimethylamine.

In the second step, the intermediate from step one containing the glycidol residues is converted into a substantially soley secondary hydroxyl containing intermediate by further hydroxyalkylation with one or more alkylene oxides containing more than two carbon atoms at about 80°-150° C. This reaction is carried out as in step one.

In the third step, an intermediate from step two is converted into the final intermediate containing substantially solely primary hydroxyls by hydroxyethylation with ethylene oxide at about 80°-150° C. The ethylene oxide is added in the presence of an inert gas such as nitrogen until the desired amount of ethylene oxide is absorbed. This reaction is carried out as in step one.

The poly(oxyalkylene) intermediates of the present invention having increased branching as described above can be converted into additional useful intermediates by many different methods depending, e.g., on the functional group desired on the final intermediate. Some of these routes are illustrated in (I) through (VII) below. These routes are given as illustrations and are not intended to limit the scope of the present invention.

Intermediates containing aldehyde functionality are prepared according to Route I, wherein Route I comprises two steps.

In the first step, the primary hydroxyl enriched aromatic amine intermediate having increased branching, H—Ar, wherein Ar— is a electron rich aromatic moiety such that H—Ar is capable of undergoing electrophilic substitution reactions such as azo coupling and formylation by Vilsmeier reaction and Ar— contains at least one —Z moiety, is reacted with an organic acid anhydride to form the acylated intermediate. Most generally, the aromatic amine intermediate, H—Ar, is reacted with acetic anhydride at a temperature within the range of about 60°-130° C. Certain tertiary organic amines are useful catalysts, such as triethylamine, dimethylaminocyclohexane and benzyldimethylamine.

In the second step, the aromatic acylated intermediate, from step one is reacted with the Vilsmeier reagent to get the corresponding aldehydes, [Bull. Societe Chim. de France, No. 10:1989-99 (October 1962); Angewandte Chemie 72, No. 22, 836-845, (November 1960)] generally using N,N-dimethylformamide (DMF) and phosphorous oxychloride. After base hydrolysis, the corresponding aromatic aldehyde intermediate, Ar—COH is isolated.

Intermediates containing nitroso functionality are prepared according to Route II.

ROUTE II

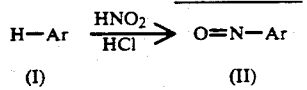

(I)        (II)

The aromatic amine intermediate (I) is nitrosated using nitrous acid to give nitroso aromatic amine intermediates (II).

Intermediates containing aromatic amine functionality are prepared according to Routes III through VII.

ROUTE III

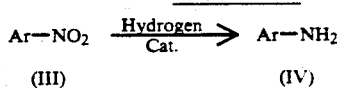

(III)        (IV)

Route III involves the conversion of nitro compounds (III) to amine intermediates (IV) by catalytic hydrogenation. Any suitable reduction catalyst may be used. For example, catalysts such as Raney nickel, nickel oxides, finely divided metals such as iron, cobalt, platinum, ruthenium, osmium, and rhodium may be used. Furthermore, metal catalysts supported on pumice, asbestos, Kieselguhr, alumina, silica gel or charcoal work equally as well. The amount of catalyst can vary from about 0.025 to 15 percent by weight based on the nitro intermediate used.

Reduction temperatures of about 20° C. to about 90° C., are suitable but temperatures of 40° C. to 90° C. are preferred since they may provide faster reaction times and higher yields. During the reduction of the nitro intermediates, pressures ranging from about 500 to about 1800 psi of hydrogen may be used.

The reduction reaction is usually carried out in the presence of a suitable solvent. Solvents include lower alcohols such as methyl alcohol, ethyl alcohol, and isopropyl alcohol; ethers such as dioxane; hydrocarbons such as benzene, toluene, xylenes, cyclohexanes, and petroleum ether; and mixtures of lower alcohols and water such as about equal parts by weight of ethyl alcohol and water. The amount of solvent present usually varies from about 30 to about 80 percent by weight of the total mixture as solvent plus nitro compound.

ROUTE IV

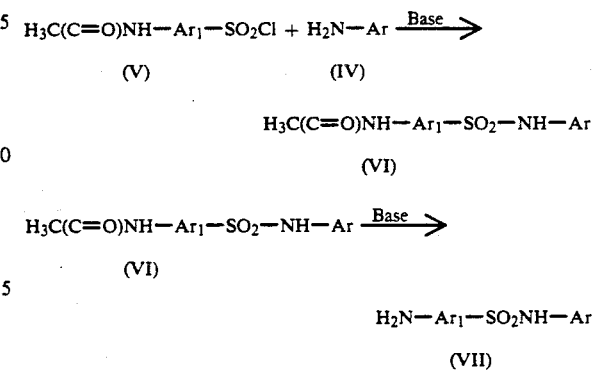

Route IV involves the condensation of an acetamidosulfonyl chloride intermediate (V), wherein $Ar_1$ is phenylene or substituted phenylene, with at least a stoichiometric quantity of an aromatic amine (IV), wherein Ar is defined above and contains at least one —Z moiety, and an inorganic base at a temperature of from about 0° C. to about 100° C. to form an acetamido intermediate (VI). Further heating at 80° C. to 100° C. hydrolyzes the corresponding acetamido intermediate (VI) into the polyaromatic amine intermediate (VII).

ROUTE V $O_2N—Ar_1—SO_2Cl + H_2N—Ar \xrightarrow{Base}$ (VIII)        (IV)

$O_2N—Ar_1—SO_2NH—Ar$ (IX)

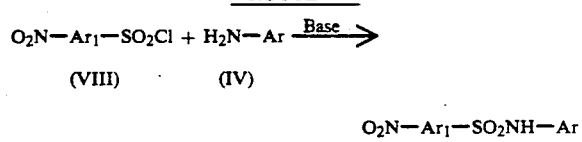

(IX)

$H_2N—Ar_1—SO_2NH—Ar$ (X)

Route V involves the condensation of a nitrosulfonyl chloride intermediate (VIII), wherein $Ar_1$ is as defined abovevin Route IV, with at least a stoichiometric quantity of an aromatic amine (IV) and an inorganic base at a temperature of from about 0° C. to about 100° C. to form a nitro polyaromatic intermediate (IX).

The corresponding polyaromatic amine intermediate (X) is then prepared by conversion of the polyaromatic nitro intermediate (IX) by catalytic reduction as described in Route III above.

Intermediates containing diazo functionality are prepared according to Route VI

ROUTE VI

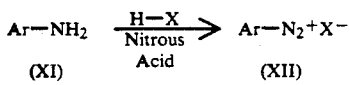

(XI)    (XII)

Carbocylic or heterocyclic amines intermediates (XI) are diazotized to give diazonium salt intermediates (XII) of the invention wherein Ar— is defined above, and contains at least one —Z moiety. Various methods for diazotizing aromatic amines prepared in Routes III-IV above are known in the chemistry of azo dyes.

Intermediates containing hydrazo functionality are prepared according to Route VII.

ROUTE VII

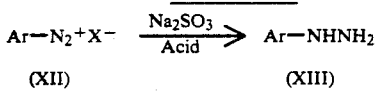

(XII)    (XIII)

The corresponding diazonium salts (XII) from Route VI above are reduced with sodium sulfite in the presence of mineral acid at a temperature of about 70°-100° C. to form the hydrazo intermediates (XIII) of the invention.

The following examples and tables illustrate specific compounds of the present invention and their preparation. Various parts or percentages, unless otherwise stated, being by weight.

The abbreviations EO, PO, and BO refer to —CH$_2$CH$_2$O—, —CH(CH$_3$)CH$_2$O—O—, and —CH(C$_2$H$_5$)CH$_2$O— respectively, or to their precursor epoxide, whichever is appropriate. In the examples, GL$_1$ represents the unterminated glycidol residue segment and GL the terminated glycidol residue segment. The numerical designation preceding each GL$_1$ and GL represents the average number of glycidol residues per reactive site of the nucleophile. For example, in Examples 1 and 1A wherein the numerical designation is 1.5, in actuality one reactive site of the nitrogen will have a single glycidol residue and the other will have two such residues linked together. Also, referring to Example 1 and 1A, the terminology "1.5GL/5PO/5EO-H" means that at least one primary hydroxyl of the GL$_1$ segment has been reacted with a propylene oxide molecule, the propylene oxide reactant having been in the reaction system in stoichiometric excess, and that the secondary hydroxyl of each terminal PO has been reacted with an ethylene oxide molecule, the ethylene oxide reactant also having been in stoichiometric excess in the reaction system. It is noted that the numerical values "5" assigned to each of the PO and EO residues of Example 1A, also represents the average number of these residues per reactive site of the nucleophile.

EXAMPLE 1

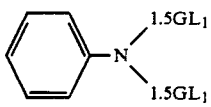

In a dry 1000 ml three-neck flask equipped with nitrogen purge, heating mantle, mechanical stirrer, temperature controller and addition funnel are charged 125 grams of aniline (1.34 moles) and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the aniline-3 glycidol intermediate and is found to be 905 (theory is 890).

EXAMPLE 1A

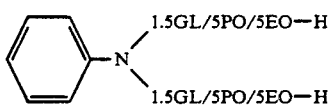

In a two liter autoclave are charged 315 grams (1 mole) of aniline 3 glycidol intermediate of Example 1 and 2 grams of potassium hydroxide catalyst. The reactor is purged three times to 60 psi with nitrogen and is then heated to 250° F. under 5 psi nitrogen pressure. Next, 580 grams (10 moles) of propylene oxide are added at a rate to maintain a vapor pressure reading less than 80 psi.

After the PO addition, the reaction mixture is post-heated at 120° C. for 2 hours. At this time the hydroxyl number is run for the reaction mixture and is found to be 325 (theory is 313).

Next, 440 grams (10 moles) of ethylene oxide (EO) are added at a rate to maintain a vapor pressure reading less than 80 psi. After the EO addition, the reaction mixture is post-heated at 120° C. for 2 hours. At this time the hydroxyl number is run for the reaction mixture and is found to be 208 (theory is 210).

After vacuum stripping at 200° F. for 15 minutes, the aniline 3GL/10PO/10EO-H intermediate has an average gram molecular weight of 1349 and is ready for use.

EXAMPLE 2

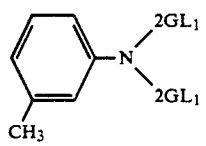

In a dry 1000 ml three-neck flask equipped with nitrogen purge, heating mantle, mechanical stirrer, temperature controller and addition funnel are charged 143 grams of m-toluidine (1.34 moles) and 0.6 gram of potassium hydroxide. The mixture is heated to 110° C. with stirring by means of the heating mantle and temperature controller.

Three hundred ninety-eight grams (5.37 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the m-toluidine 4 glycidol intermediate and is found to be 875 (theory is 835).

EXAMPLE 2A

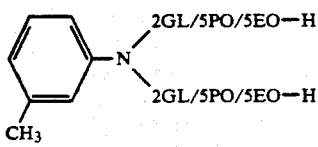

In a two liter autoclave are charged 403 grams (1 mole) of m-toluidine 4 glycidol intermediate of Example 2 and 4 grams of potassium hydroxide catalyst. The reactor is purged three times to 60 psi with nitrogen and is then heated to 250° F. under 5 psi nitrogen pressure. Next, 580 grams (10 moles) of propylene oxide are added at a rate to maintain a vapor pressure reading less than 80 psi.

After the PO addition, the reaction mixture is post-heated at 120° C. for 2 hours. At this time the hydroxyl number is run for the reaction mixture and is found to be 337 (theory is 349).

Next, 440 grams (10 moles) of ethylene oxide (EO) are added at a rate to maintain a vapor pressure reading less than 80 psi. After the EO addition, the reaction mixture is post-heated at 120° C. for 2 hours. At this time the hydroxyl number is run for the reaction mixture and is found to be 235 (theory is 234).

After vacuum stripping at 200° F. for 15 minutes, the m-toludine 4GL/10PO/10EO-H intermediate has an average gram molecular weight of 1432 and is ready for use.

EXAMPLE 3

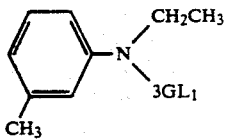

In a dry 1000 ml three-neck flask equipped with nitrogen purge, heating mantle, mechanical stirrer, temperature controller and addition funnel are charged 181 grams of N-ethyl- m-toluidine (1.34 moles) and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°-125° C. by the addition rate.

After all of the glycidol is charged, the reaction mixture is post-heated for one hour. At this time the hydroxyl number is run for the N-ethyl-m-toluidine 3 glycidol intermediate and is found to be 659 (theory is 629).

EXAMPLE 3A

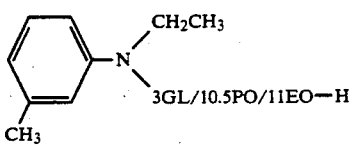

In a two liter autoclave are charged 355 grams (1 mole) of N-ethyl-m-toluidine 3 glycidol intermediate of Example 3 and 4 grams of potassium hydroxide catalyst. The reactor is purged three times to 60 psi with nitrogen and is then heated to 250° F. under 5 psi nitrogen pressure. Next, 610 grams (10.5 moles) of propylene oxide are added at a rate to maintain a vapor pressure reading less than 80 psi.

After the PO addition, the reaction mixture is post-heated at 120° C. for 2 hours. At this time the hydroxyl number is run for the reaction mixture and is found to be 250 (theory is 231).

Next, 484 grams (11.0 moles) of ethylene oxide (EO) are added at a rate to maintain a vapor pressure reading less than 80 psi. After the EO addition, the reaction mixture is post-heated at 120° C. for 2 hours. At this time the hydroxyl number is run for the reaction mixture and is found to be 187 (theory is 155).

After vacuum stripping at 200° F. for 15 minutes, the N-ethyl-m-toludine 3GL/10.5PO/11EO-H intermediate has an average gram molecular weight of 1343 and is ready for use.

EXAMPLE 4

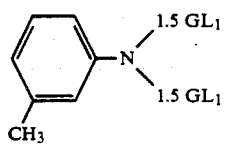

In a dry 1000 ml three-neck flask equipped with nitrogen purge, heating mantle, mechanical stirrer, temperature controller and addition funnel are charged 200 grams of m-toluidine (1.86 moles) and 0.6 gram of potassium hydroxide. The mixture is heated to 110° C. with stirring by means of the heating mantle and temperature controller.

Four hundred fifteen grams (5.6 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the m-toluidine 3 glycidol intermediate and is found to be 834 (theory is 858).

EXAMPLE 4A

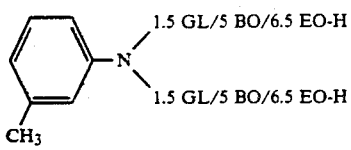

In a two liter autoclave are charged 270 grams (0.8 mole) of m-toluidine 3 glycidol intermediate of Example 4 and 3 grams of potassium hydroxide catalyst. The reactor is purged three times to 60 psi with nitrogen and is then heated to 250° F. under 5 psi nitrogen pressure. Next, 580 grams (8.06 moles) of butylene oxide are added at a rate to maintain a vapor pressure reading less than 80 psi.

After the BO addition, the reaction mixture is post-heated at 120° C. for 2 hours.

Next, 460 grams (10.5 moles) of ethylene oxide (EO) are added at a rate to maintain a vapor pressure reading less than 80 psi. After the EO addition, the reaction mixture is post-heated at 120° C. for 2 hours. After vacuum stripping at 200° F. for 15 minutes, the m-toluidine 3GL/10BO/13EO-H intermediate has an average gram molecular weight of 1621 and is ready for use.

EXAMPLE 5

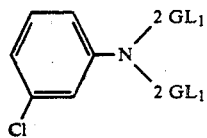

In a dry 1000 ml three-neck flask equipped with nitrogen purge, heating mantle, mechanical stirrer, temperature controller and addition funnel are charged 172 grams of m-chloroaniline (1.34 moles) and 0.6 gram of potassium hydroxide. The mixture is heated to 110° C. with stirring by means of the heating mantle and temperature controller.

Three hundred ninety-eight grams (5.37 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the m-chloroaniline 3 glycidol intermediate and is found to be 793 (theory is 799).

EXAMPLE 5A

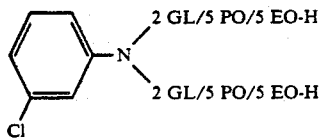

In a two liter autoclave are charged 375 grams (0.9 mole) of m-chloroaniline 3 glycidol intermediate of Example 5 and 4 grams of potassium hydroxide catalyst. The reactor is purged three times to 60 psi with nitrogen and is then heated to 250° F. under 5 psi nitrogen pressure. Next, 530 grams (9.4 moles) of propylene oxide are added at a rate to maintain a vapor pressure reading less than 80 psi.

After the PO addition, the reaction mixture is post-heated at 120° C. for 2 hours. At this time the hydroxyl number is run for the reaction mixture and is found to be 320 (theory is 331).

Next, 425 grams (9.7 moles) of ethylene oxide (EO) are added at a rate to maintain a vapor pressure reading less than 80 psi. After the EO addition, the reaction mixture is post-heated at 120° C. for 2 hours. At this time the hydroxyl number is run for the reaction mixture and is found to be 229 (theory is 229).

After vacuum stripping at 200° F. for 15 minutes, the m-chloroaniline 3GL/10PO/10EO-H intermediate has an average gram molecular weight of 1470 and is ready for use.

EXAMPLE 6

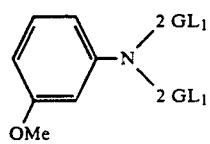

In a dry 1000 ml three-neck flask equipped with nitrogen purge, heating mantle, mechanical stirrer, temperature controller and addition funnel are charged 165 grams of m-anisidine (1.34 moles) and 0.8 gram of potassium hydroxide. The mixture is heated to 110° C. with stirring by means of the heating mantle and temperature controller.

Three hundred ninety-eight grams (5.37 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the m-anisidine 4 glycidol intermediate and is found to be 803 (theory is 807).

EXAMPLE 6A

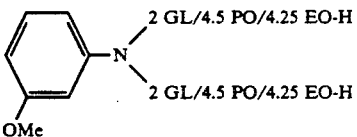

In a two liter autoclave are charged 450 grams (1.1 mole) of m-anisidine 4 glycidol intermediate of Example 6 and 4 grams of potassium hydroxide catalyst. The reactor is purged three times to 60 psi with nitrogen and is then heated to 250° F. under 5 psi nitrogen pressure. Next, 585 grams (10 moles) of propylene oxide are added at a rate to maintain a vapor pressure reading less than 80 psi.

After the PO addition, the reaction mixture is post-heated at 120° C. for 2 hours. At this time the hydroxyl number is run for the reaction mixture and is found to be 333 (theory is 352).

Next, 430 grams (9.8 moles) of ethylene oxide (EO) are added at a rate to maintain a vapor pressure reading less than 80 psi. After the EO addition, the reaction mixture is post-heated at 120° C. for 2 hours. At this time the hydroxyl number is run for the reaction mixture and is found to be 232 (theory is 213).

After vacuum stripping at 200° F. for 15 minutes, the m-anisidine 4GL/9PO/8.5EO-H intermediate has an average gram molecular weight of 1384 and is ready for use.

EXAMPLE 7

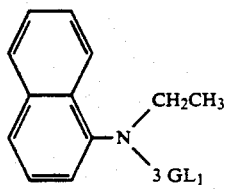

In a dry 1000 ml three-neck flask equipped with nitrogen purge, heating mantle, mechanical stirrer, temperature controller and addition funnel are charged 171 grams of N-ethyl 1-naphthylamine (1 mole) and 0.6 gram of potassium hydroxide. The mixture is heated to 110° C. with stirring by means of the heating mantle and temperature controller.

Two hundred twenty-two grams (3 moles) of glycidol are slowly dropwise added through the addition funnel. The first few milliliters cause a slight temperature drop before the exotherm begins. Once its starts, the heating mantle is removed and the exotherm controlled by the addition rate. The temperature is maintained between 110°-125° C. by the addition rate.

After all of the glycidol is charged, the reaction mixture is post-heated for one hour.

EXAMPLE 7A

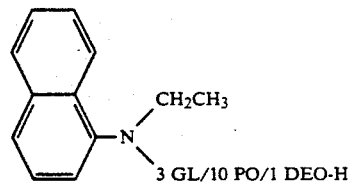

In a two liter autoclave are charged 393 grams (1 mole) of N-ethyl-1-naphthylamine 3 glycidol intermediate of Example 7 and 4 grams of potassium hydroxide catalyst. The reactor is purged three times to 60 psi with nitrogen and is then heated to 250° F. under 5 psi nitrogen pressure. Next, 585 grams (10 moles) of propylene oxide are added at a rate to maintain a vapor pressure reading less than 80 psi.

After the PO addition, the reaction mixture is post-heated at 120° C. for 2 hours.

Next, 430 grams (9.8 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the N-ethyl-1-naphthylamine 3GL/10PO/10EO-H intermediate has an average gram molecular weight of 1413 and is ready for use.

EXAMPLE 8

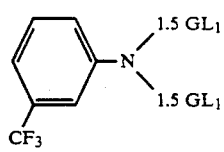

In a dry 1000 ml three-neck flask equipped with nitrogen purge, heating mantle, mechanical stirrer, temperature controller and addition funnel are charged 215.5 grams of m-trifluoromethylaniline (1.34 moles) and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the m-trifluoromethylaniline 3 glycidol intermediate and is found to be 730 (theory is 713).

EXAMPLE 8A

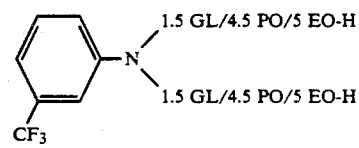

In a two liter autoclave are charged 393 grams (1.03 moles) of m-trifluoromethylaniline 3 glycidol intermediate of Example 8 and 4 grams of potassium hydroxide catalyst. The reactor is purged three times to 60 psi with nitrogen and is then heated to 250° F. under 5 psi nitrogen pressure. Next, 555 grams (9.6 moles) of propylene oxide are added at a rate to maintain a vapor pressure reading less than 80 psi.

After the PO addition, the reaction mixture is post-heated at 120° C. for 2 hours. At this time the hydroxyl number is run for the reaction mixture and is found to be 299 (theory is 304).

Next, 420 grams (9.5 moles) of ethylene oxide (EO) are added at a rate to maintain a vapor pressure reading less than 80 psi. After the EO addition, the reaction mixture is post-heated at 120° C. for 2 hours. At this time the hydroxyl number is run for the reaction mixture and is found to be 204 (theory is 207).

After vacuum stripping at 200° F. for 15 minutes, the m-trifluoromethylaniline 3GL/9PO/10EO-H intermediate has an average gram molecular weight of 1355 and is ready for use.

EXAMPLE 9

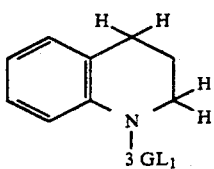

In a dry 1000 ml three-neck flask equipped with nitrogen purge, heating mantle, mechanical stirrer, temperature controller and addition funnel are charged 180 grams of tetrahydroquinoline (1.34 moles) and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the tetrahydroquinoline 3 glycidol intermediate and is found to be 673 (theory is 632).

EXAMPLE 9A

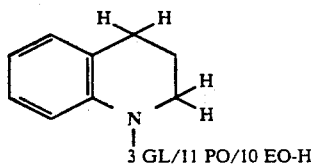

In a two liter autoclave are charged 487 grams (1.37 moles) of tetrahydroquinoline 3 glycidol intermediate of Example 9 and 5 grams of potassium hydroxide catalyst. The reactor is purged three times to 60 psi with nitrogen and is then heated to 250° F. under 5 psi nitrogen pressure. Next, 850 grams (14.7 moles) of propylene oxide are added at a rate to maintain a vapor pressure reading less than 80 psi.

After the PO addition, the reaction mixture is post-heated at 120° C. for 2 hours. At this time the hydroxyl number is run for the reaction mixture and is found to be 224 (theory is 230).

Next, 565 grams (12.8 moles) of ethylene oxide (EO) are added at a rate to maintain a vapor pressure reading less than 80 psi. After the EO addition, the reaction mixture is post-heated at 120° C. for 2 hours. At this time the hydroxyl number is run for the reaction mixture and is found to be 159 (theory is 160).

After vacuum stripping at 200° F. for 15 minutes, the tetrahydroquinoline 3GL/11PO/10EO-H intermediate has an average gram molecular weight of 1402 and is ready for use.

EXAMPLE 10

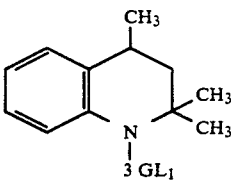

In a dry 1000 ml three-neck flask equipped with nitrogen purge, heating mantle, mechanical stirrer, temperature controller and addition funnel are charged 234.5 grams of 2,2,4-trimethyl-1,2,3,4-tetrahydroquinoline (1.34 moles) and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour.

EXAMPLE 10A

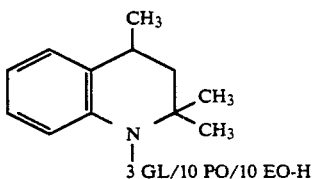

In a two liter autoclave are charged 397 grams (1 mole) of 2,2,4-trimethyl-1,2,3,4-tetrahydroquinoline 3 glycidol intermediate of Example 10 and 5 grams of potassium hydroxide catalyst. The reactor is purged three times to 60 psi with nitrogen and is then heated to 250° F. under 5 psi nitrogen pressure. Next, 580 grams (10 moles) of propylene oxide are added at a rate to maintain a vapor pressure reading less than 80 psi.

After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the 2,2,4-trimethyl-1,2,3,4-tetrahydroquinoline 3GL/10PO/10EO-H intermediate has an average gram molecular weight of 1417 and is ready for use.

EXAMPLE 11

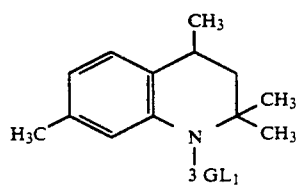

In a dry 1000 ml three-neck flask equipped with nitrogen purge, heating mantle, mechanical stirrer, temperature controller and addition funnel are charged 253.3 grams of 2,2,4,7-tetramethyl-1,2,3,4-tetrahydroquinoline (1.34 moles) and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour.

EXAMPLE 11A

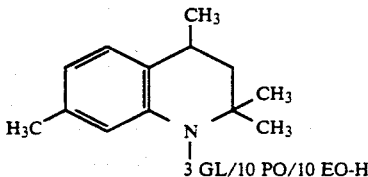

In a two liter autoclave are charged 411 grams (1 mole) of 2,2,4,7-tetramethyl-1,2,3,4-tetrahydroquinoline 3 glycidol intermediate of Example 11 and 4 grams of potassium hydroxide catalyst. The reactor is purged three times to 60 psi with nitrogen and is then heated to 250° F. under 5 psi nitrogen pressure. Next, 580 grams (10 moles) of propylene oxide are added at a rate to maintain a vapor pressure reading less than 80 psi.

After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the 2,2,4.7-tetramethyl-1,2,3,4-tetrahydroquinoline 3GL/10PO/10EO-H intermediate has an average gram molecular weight of 1431 and is ready for use.

EXAMPLE 12

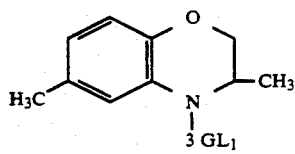

In a dry 1000 ml three-neck flask equipped with nitrogen purge, heating mantle, mechanical stirrer, temperature controller and addition funnel are charged 217 grams of benzomorpholine (1.34 moles) and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the benzomorpholine 3 glycidol intermediate and is found to be 536 (theory is 584).

EXAMPLE 12A

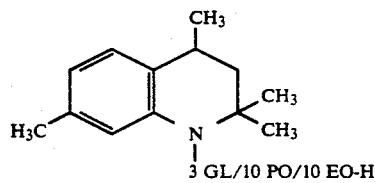

In a two liter autoclave are charged 450 grams (1.2 moles) of benzomorpholine 3 glycidol intermediate of Example 12 and 4 grams of potassium hydroxide catalyst. The reactor is purged three times to 60 psi with nitrogen and is then heated to 250° F. under 5 psi nitrogen pressure. Next, 625 grams (10.8 moles) of propylene oxide are added at a rate to maintain a vapor pressure reading less than 80 psi.

After the PO addition, the reaction mixture is post-heated at 120° C. for 2 hours.

Next, 530 grams (12 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the benzomorpholine 3GL/10PO/10EO-H intermediate has an average gram molecular weight of 1448 and is ready for use.

EXAMPLE 13

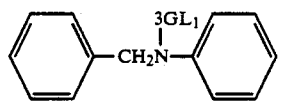

In a dry 1000 ml three-neck flask equipped with nitrogen purge, heating mantle, mechanical stirrer, temperature controller and addition funnel are charged 245 grams of N-benzylaniline (1.34 moles), 400 grams of xylenes and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour.

EXAMPLE 13A

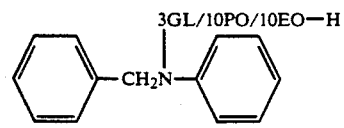

In a two liter autoclave are charged 405 grams (1 mole) of N-benzylaniline 3 glycidol intermediate of Example 13 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi.

After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the N-benzylaniline 3GL/10PO/10EO-H intermediate has an average gram molecular weight of 1424 and is ready for use.

EXAMPLE 14

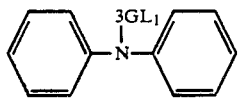

In a dry 1000 ml three-neck flask equipped with nitrogen purge, heating mantle, mechanical stirrer, temperature controller and addition funnel are charged 169 grams of diphenylamine (1 mole), 400 grams of xylenes and 0.6 gram of potassium hydroxide. The mixture is heated to 110° C. with stirring by means of the heating mantle and temperature controller.

Two hundred twenty-two grams (3 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour.

EXAMPLE 14A

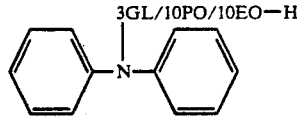

In a two liter autoclave are charged 391 grams (1 mole) of diphenylamine 3 glycidol intermediate of Example 14 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi.

After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the diphenylamine 3GL/10PO/10EO-H intermediate has an average gram molecular weight of 1411 and is ready for use.

EXAMPLE 15

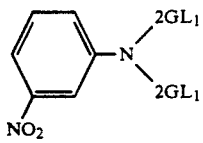

In a dry 1000 ml three-neck flask equipped with nitrogen purge, heating mantle, mechanical stirrer, temperature controller and addition funnel are charged 138 grams of m-nitroaniline (1 mole), 400 grams of xylenes and 0.6 gram of potassium hydroxide. The mixture is heated to 110° C. with stirring with by means of the heating mantle and temperature controller.

Two hundred nintey-six grams (4 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the m-nitroaniline 4 glycidol intermediate and is found to be 777 (theory is 776).

EXAMPLE 15A

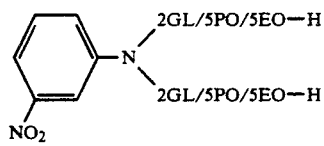

In a two liter autoclave are charged 434 grams (1 mole) of m-nitroaniline 4 glycidol intermediate of Example 15 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi. After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the m-nitroaniline 4GL/10PO/10EO-H intermediate has an average gram molecular weight of 1454 and is ready for use.

EXAMPLE 16

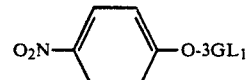

In a dry 1000 ml three-neck flask equipped with nitrogen purge, heating mantle, mechanical stirrer, temperature controller and addition funnel are charged 139 grams of p-nitrophenol (1 mole), 400 grams of xylenes and 0.6 gram of potassium hydroxide. The mixture is heated to 110° C. with stirring by means of the heating mantle and temperature controller.

Two hundred twenty-two grams (3 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the p-nitrophenol 3 glycidol intermediate and is found to be 653 (theory is 621).

EXAMPLE 16A

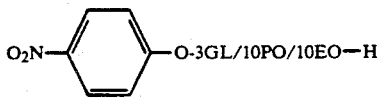

In a two liter autoclave are charged 361 grams (1 mole) of p-nitrophenol 3 glycidol intermediate of Example 16 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi. After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the p-nitrophenol 3GL/10PO/10EO-H intermediate has an average gram molecular weight of 1381 and is ready for use.

EXAMPLE 17

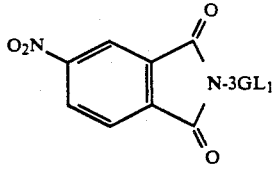

In a dry 1000 ml three-neck flask equipped with nitrogen purge, heating mantle, mechanical stirrer, temperature controller and addition funnel are charged 257 grams of 4-nitrophthalimide (1.34 mole), 400 grams of xylenes and 0.6 gram of potassium hydroxide. The mixture is heated to 110° C. with stirring with by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour.

EXAMPLE 17A

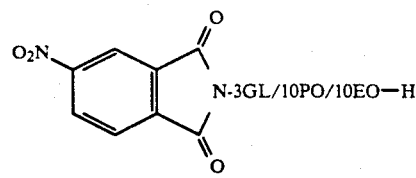

In a two liter autoclave are charged 414 grams (1 mole) of 4-nitrophthalimide 3 glycidol intermediate of Example 17 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi. After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the 4-nitrophthalimide 3GL/10PO/10EO-H intermediate has an average gram molecular weight of 1434 and is ready for use.

EXAMPLE 18

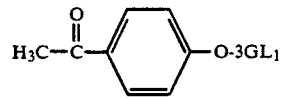

In a dry 1000 ml three-neck flask equipped with nitrogen purge, heating mantle, mechanical stirrer, temperature controller and addition funnel are charged 182 grams of 4-hydroxyacetophenone (1.34 mole), 400 grams of xylenes and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour.

EXAMPLE 18A

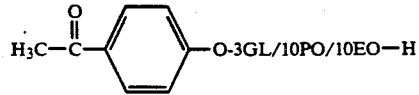

In a two liter autoclave are charged 358 grams (1 mole) of 4-oxyacetophenone 3 glycidol intermediate of Example 18 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi. After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the 4-oxyacetophenone 3GL/10PO/10EO-H intermediate has an average gram molecular weight of 1378 and is ready for use.

EXAMPLE 19

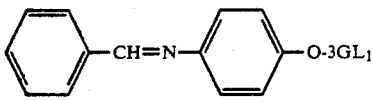

In a dry 1000 ml three-neck flask equipped with nitrogen purge, heating mantle, mechanical stirrer, temperature controller and addition funnel are charged 363 grams of N-benzylidene-4-hydroxyaniline (1.34 mole), 400 grams of xylenes and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour. At this time the hydroxyl number is run for the N-benzylidene-4-hydroxyaniline 3 glycidol intermediate and is found to be 637 (theory is 537).

EXAMPLE 19A

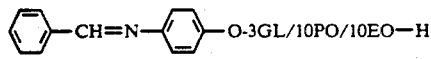

In a two liter autoclave are charged 418 grams (1 mole) of N-benzylidene-4-hydroxyaniline 3 glycidol intermediate of Example 19 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi. After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the N-benzylidene-4-hydroxyaniline 3GL/10PO/10EO-H intermediate has an average gram molecular weight of 1438 and is ready for use.

EXAMPLE 20

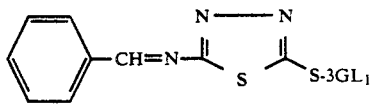

In a dry 1000 ml three-neck flask equipped with nitrogen purge, heating mantle, mechanical stirrer, temperature controller and addition funnel are charged 176 grams of N-benzylidene-2-amino-5-mercapto-1,3,4-thiadiazole (0.8 mole), 400 grams of xylenes and 0.6 grams of potassium hydroxide. The mixture is heated to 110° C. with stirring by means of the heating mantle and temperature controller.

One hundred seventy-seven grams (2.4 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour.

EXAMPLE 20A

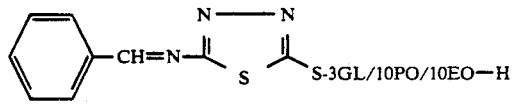

In a two liter autoclave are charged 443 grams (1 mole) of N-benzylidene-5-amino-2-mercapto-1,3,4-thiadiazole 3 glycidol intermediate of Example 20 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi. After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the N-benzylidene-5-amino-2-mercapto-1,3,4-thiadiazole 3GL/10PO/10EO-H intermediate has an average gram molecular weight of 1463 and is ready for use.

EXAMPLE 21

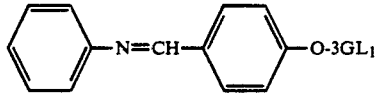

In a dry 1000 ml three-neck flask equipped with nitrogen purge, heating mantle, mechanical stirrer, temperature controller and addition funnel are charged 98.5 grams of N-(4-hydroxybenzylidene)-aniline (0.5 mole), 200 grams of xylenes and 0.6 gram of potassium hydroxide. The mixture is heated to 110° C. with stirring by means of the heating mantle and temperature controller.

One hundred eleven grams (1.5 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour.

by the addition rate. The temperature is maintained between 110°-125° C. by the addition rate.

After all of the glycidol is charged, the reaction mixture is post-heated for one hour. At this time the hydroxyl number is run for the 4-amino-1,8-naphthalimide 12.5 glycidol intermediate and is found to be 791 (theory is 783).

EXAMPLE 22A

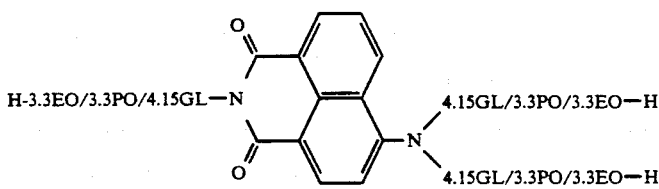

EXAMPLE 21A

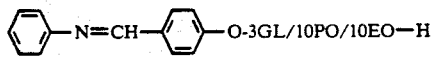

In a two liter autoclave are charged 419 grams (1 mole) of N-(4-hydroxybenzylidene)-aniline 3 glycidol intermediate of Example 21 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi. After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the N-(4-hydroxybenzylidene)-aniline 3GL/10PO/10EO-H intermediate has an average gram molecular weight of 1439 and is ready for use.

EXAMPLE 22

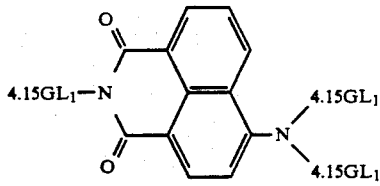

In a dry 1000 ml three-neck flask equipped with nitrogen purge, heating mantle, mechanical stirrer, temperature controller and addition funnel are charged 42.4 grams of 4-amino-1,8-naphthalimide (0.2 mole), 300 grams of xylenes and 0.3 gram of potassium hydroxide. The mixture is heated to 110° C. with stirring by means of the heating mantle and temperature controller.

One hundred eighty-seven grams (2.5 moles) of glycidol are slowly dropwise added through the addition funnel. The first few milliliters cause a slight temperature drop before the exotherm begins. Once it starts, the heating mantle is removed and the exotherm controlled In a two liter autoclave are charged 1137 grams (1 mole) of 4-amino-1,8-naphthalimide 3 glycidol intermediate of Example 22 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi. After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the 4-amino-1,8-naphthalimide 12.5GL/10PO/10EO-H intermediate has an average gram molecular weight of 2157 and is ready for use.

EXAMPLE 23

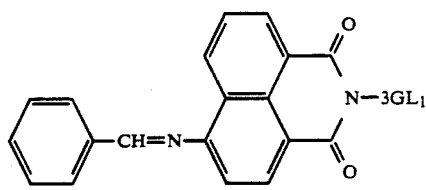

In a dry 1000 ml three-neck flask equipped with nitrogen purge, heating mantle, mechanical stirrer, temperature controller and addition funnel are charged 150 grams of N-(benzylidene)-4-amino-1,8-naphthalimide (0.5 mole), 300 grams of xylenes and 0.3 gram of potassium hydroxide. The mixture is heated to 110° C. with stirring by means of the heating mantle and temperature controller.

One hundred eleven grams (1.5 moles) of glycidol are slowly dropwise added through the addition funnel. The first few milliliters cause a slight temperature drop before the exotherm begins. Once it starts, the heating mantle is removed and the exotherm controlled by the addition rate. The temperature is maintained between 110°-125° C. by the addition rate.

After all of the glycidol is charged, the reaction mixture is post-heated for one hour.

EXAMPLE 23A

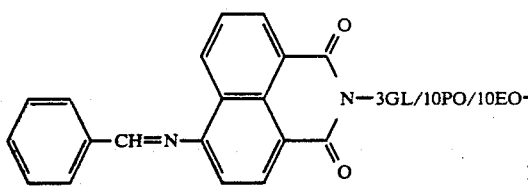

In a two liter autoclave are charged 522 grams (1 mole) of N-(benzylidene)-4-amino-1,8-naphthalimide 3 glycidol intermediate of Example 23 and 4 grams of potassium hydroxide catalyst. The reactor is purged three times to 60 psi with nitrogen and is then heated to 250° F. under 5 psi nitrogen pressure.

Next, 580 grams (10 moles) of propylene oxide are added at a rate to maintain a vapor pressure reading less than 80 psi. After the PO addition, the reaction mixture is post-heated at 120° C. for 2 hours.

Next, 440 grams (10 moles) of ethylene oxide (EO) are added at a rate to maintain a vapor pressure reading less than 80 psi. After the EO addition, the reaction mixture is post-heated at 120° C. for 2 hours.

After vacuum stripping at 200° F. for 15 minutes, the N-(benzylidene)-4-amino-1,8-naphthalimide 3GL/10PO/10EO-H intermediate has an average gram molecular weight of 1542 and is ready for use.

EXAMPLE 24

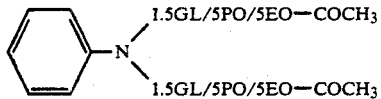

A mixture is prepared by charging 1349 grams (1 mole) of aniline 3GL/10PO/10EO-H intermediate of Example 1A and 7 moles of acetic anhydride. The mixture is stirred mechanically and five drops of N-methylimidazole catalyst are added. After the initial exotherm, the reaction mixture is heated to 100°-120° C. and is maintained at 110°-110° C. for an additional two hours to insure complete reaction. The mixture is cooled and the product is isolated by removing the excess acetic acid and acetic anhydride under reduced pressure at 90° C. An IR spectrum of the resulting liquid product displays an absence of hydroxyl absorbance and characteristic carbonyl absorbance of the corresponding acetate intermediate.

EXAMPLE 24A

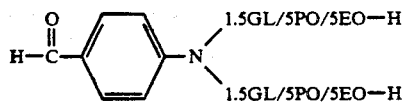

A dry 2000 ml three-neck flask is charged with 181 grams N,N-dimethylformamide under nitrogen and cooled to 0° C. One hundred ninety-two grams of phosphorous oxychloride are added dropwise at less than 10° C. with mechanical stirring and cooling over one hour. The resulting mixture is stirred for an additional two hours at 0°-5° C. Then 1428 grams (1 mole) of the aniline 3GL/10PO/10EO acetate intermediate for Example 24 are added dropwise. The reaction mixture is gradually heated to 90° C. and held at this temperature for an additional two hours to insure complete reaction. After cooling, the mixture is diluted with an equal amount of ice and 2.5 moles of sodium hydroxide (50 percent by weight). The resulting mixture is heated at 50°-60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed under reduced pressure at 90° C. The resulting liquid has a maximum absorbance at 341 nm. An IR spectrum of the resulting liquid product displays both the presence of hydroxyl absorbance and characteristic carbonyl absorbance of the corresponding formyl intermediate.

EXAMPLE 25

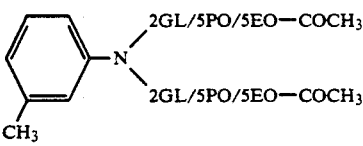

A mixture is prepared by charging 1423 grams (1 mole) of m-toluidine 4GL/10PO/10EO-H intermediate of Example 2A and 7 moles of acetic anhydride. The mixture is stirred mechanically and five drops of N-methylimidazole catalyst are added. After the initial exotherm, the reaction mixture is heated to 100°-120° C. and is maintained at 110°-110° C. for an additional two hours to insure complete reaction. The mixture is cooled and the product is isolated by removing the excess acetic acid and acetic anhydride under reduced pressure at 90° C. An IR spectrum of the resulting liquid product displays an absence of hydroxyl absorbance and characteristic carbonyl absorbance of the corresponding acetate intermediate.

EXAMPLE 25A

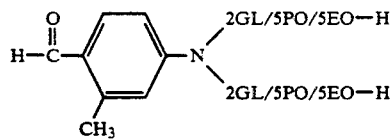

A dry 2000 ml three-neck flask is charged with 181 grams N,N-dimethylformamide under nitrogen and cooled to 0° C. One hundred ninety-two grams of phosphorous oxychloride are added dropwise less than 10° C. with mechanical stirring and cooling over one hour. The resulting mixture is stirred for an additional two hours at 0°-5° C. Then 1507 grams (1 mole) of the m-toluidine 4GL/10PO/10EO acetate intermediate from Example 25 are added dropwise. The reaction mixture is gradually heated to 90° C. and held at this temperature for an additional two hours to insure complete reaction. After cooling, the mixture is diluted with an equal amount of ice and 2.5 moles of sodium hydroxide (50 percent by weight). The resulting mixture is heated at 50°-60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed under reduced pressure at 90° C. The resulting liquid has a maximum absorbance at 342 nm. An IR spectrum of the resulting liquid product displays both the presence of hydroxyl absorbance and characteristic carbonyl absorbance of the corresponding formyl intermediate.

EXAMPLE 26

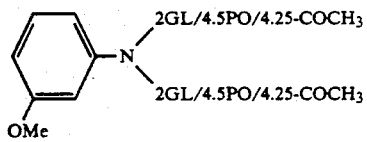

A mixture is prepared by charging 1384 grams (1 mole) of m-anisidine 4GL/9PO/8.5EO-H intermediate of Example 6A and 7 moles of acetic anhydride. The mixture is stirred mechanically and five drops of N-methylimidazole catalyst are added. After the initial exotherm, the reaction mixture is heated to 100°-120° C. and is maintained at 110°-110° C. for an additional two hours to insure complete reaction. The mixture is cooled and the product is isolated by removing the excess acetic acid and acetic anhydride under reduced pressure at 90° C. An IR spectrum of the resulting liquid product displays an absence of hydroxyl absorbance and characteristic carbonyl absorbance of the corresponding acetate intermediate.

EXAMPLE 26A

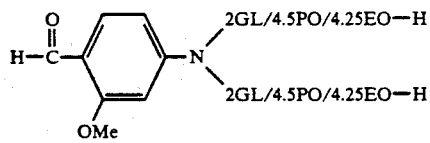

A dry 2000 ml three-neck flask is charged with 181 grams N,N-dimethylformamide under nitrogen and cooled to 0° C. One hundred ninety-two grams of phosphorous oxychloride are added dropwise at less than 10° C. with mechanical stirring and cooling over one hour. The resulting mixture is stirred for an additional two hours at 0°-5° C. Then 1468 grams (1 mole) of the m-anisidine 4GL/9PO/8.5EO acetate intermediate from Example 26 are added dropwise. The reaction mixture is gradually heated to 90° C. and held at this temperature for an additional two hours to insure complete reaction. After cooling, the mixture is diluted with an equal amount of ice and 2.5 moles of sodium hydroxide (50 percent by weight). The resulting mixture is heated at 50°-60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed under reduced pressure at 90° C. The resulting liquid has a maximum absorbance at 347 nm. An IR spectrum of the resulting liquid product displays both the presence of hydroxyl absorbance and characteristic carbonyl absorbance of the corresponding formyl intermediate.

EXAMPLE 27

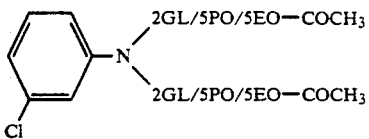

A mixture is prepared by charging 1470 grams (1 mole) of m-chloroaniline 4GL/10PO/10EO-H intermediate of Example 5A and 7 moles of acetic anhydride. The mixture is stirred mechanically and five drops of N-methylimidazole catalyst are added. After the initial exotherm, the reaction mixture is heated to 100°-120° C. and is maintained at 110°-110° C. for an additional two hours to insure complete reaction. The mixture is cooled and the product is isolated by removing the excess acetic acid and acetic anhydride under reduced pressure at 90° C. An IR spectrum of the resulting liquid product displays an absence of hydroxyl absorbance and characteristic carbonyl absorbance of the corresponding acetate intermediate.

EXAMPLE 27A

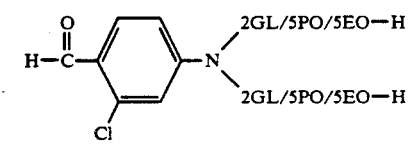

A dry 2000 ml three-neck flask is charged with 181 grams N,N-dimethylformamide under nitrogen and cooled to 0° C. One hundred ninety-two grams of phosphorous oxychloride are added dropwise at less than 10° C. with mechanical stirring and cooling over one hour. The resulting mixture is stirred for an additional two hours at 0°-5° C. Then 1554 grams (1 mole) of the m-chloroaniline 4GL/10PO/10EO acetate intermediate from Example 27 are added dropwise. The reaction mixture is gradually heated to 90° C. and held at this temperature for an additional two hours to insure complete reaction. After cooling, the mixture is diluted with an equal amount of ice and 2.5 moles of sodium hydroxide (50 percent by weight). The resulting mixture is heated at 50°-60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed under reduced pressure at 90° C. The resulting liquid has a maximum absorbance at 346 nm. An IR spectrum of the resulting liquid product displays both the presence of hydroxyl absorbance and characteristic carbonyl absorbance of the corresponding formyl intermediate.

EXAMPLE 28

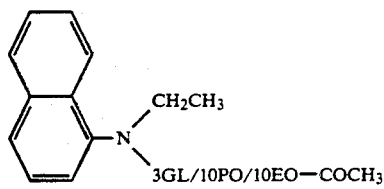

A mixture is prepared by charging 1413 grams (1 mole) of N-ethyl-1-naphthylamine 3GL/10PO/10EO-H intermediate of Example 7A and 5 moles of acetic anhydride. The mixture is stirred mechanically and five drops of N-methylimidazole catalyst are added. After the initial exotherm, the reaction mixture is heated to 100°-120° C. and is maintained at 110°-110° C. for an additional two hours to insure complete reaction. The mixture is cooled and the product is isolated by removing the excess acetic acid and acetic anhydride under reduced pressure at 90° C. An IR spectrum of the resulting liquid product displays an absence of hydroxyl absorbance and characteristic carbonyl absorbance of the corresponding acetate intermediate.

EXAMPLE 28A

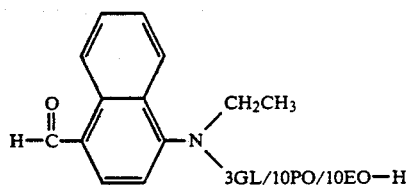

A dry 2000 ml three-neck flask is charged with 181 grams N,N-dimethylformamide under nitrogen and cooled to 0° C. One hundred ninety-two grams of phosphorous oxychloride are added dropwise at less than 10° C. with mechanical stirring and cooling over one hour. The resulting mixture is stirred for an additional two hours at 0°-5° C. Then 1497 grams (1 mole) of N-ethyl-1-naphthylamine 3GL/10PO/10EO acetate intermediate from example 28 are added dropwise. The reaction mixture is gradually heated to 90° C. and held at this temperature for an additional two hours to insure complete reaction. After cooling, the mixture is diluted with an equal amount of ice and 2.5 moles of sodium hydroxide (50 percent by weight). The resulting mixture is heated at 50°-60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed under reduced pressure at 90° C. An IR spectrum of the resulting liquid product displays both the presence of hydroxyl absorbance and characteristic carbonyl absorbance of the corresponding formyl intermediate.

EXAMPLE 29

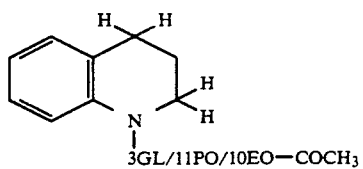

A mixture is prepared by charging 1402 grams (1 mole) of tetrahydroquinoline 3GL/10PO/10EO-H intermediate of Example 9A and 5 moles of acetic anhydride. The mixture is stirred mechanically and five drops of N-methylimidazole catalyst are added. After the initial exotherm, the reaction mixture is heated to 100°-120° C. and is maintained at 110°-110° C. for an additional two hours to insure complete reaction. The mixture is cooled and the product is isolated by removing the excess acetic acid and acetic anhydride under reduced pressure at 90° C. An IR spectrum of the resulting liquid product displays an absence of hydroxyl absorbance and characteristic carbonyl absorbance of the corresponding acetate intermediate.

EXAMPLE 29A

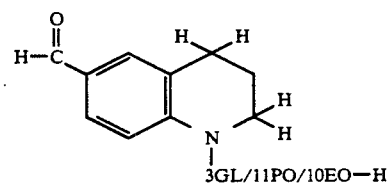

A dry 2000 ml three-neck flask is charged with 181 grams N,N-dimethylformamide under nitrogen and cooled to 0° C. One hundred ninety-two grams of phosphorous oxychloride are added dropwise at less than 10° C. with mechanical stirring and cooling over one hour. The resulting mixture is stirred for an additional two hours at 0°-5° C. Then 1444 grams (1 mole) of the tetrahydroquinoline 3GL/11PO/10EO acetate intermediate from Example 29 are added dropwise. The reaction mixture is gradually heated to 90° C. and held at this temperature for an additional two hours to insure complete reaction. After cooling, the mixture is diluted with an equal amount of ice and 2.5 moles of sodium hydroxide (50 percent by weight). The resulting mixture is heated at 50°-60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed under reduced pressure at 90° C. An IR spectrum of the resulting liquid product displays both the presence of hydroxyl absorbance and characteristic carbonyl absorbance of the corresponding formyl intermediate.

EXAMPLE 30

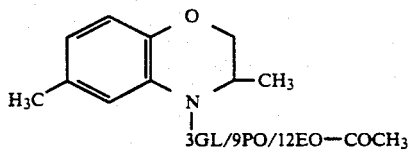
3GL/9PO/12EO—COCH₃

A mixture is prepared by charging 1448 grams (1 mole) of benzomorpholine 3GL/9PO/12EO-H intermediate of Example 12A and 5 moles of acetic anhydride. The mixture is stirred mechanically and five drops of N-methylimidazole catalyst are added. After the initial exotherm, the reaction mixture is heated to 100°-120° C. and is maintained at 110°-110° C. for an additional two hours to insure complete reaction. The mixture is cooled and the product is isolated by removing the excess acetic acid and acetic anhydride under reduced pressure at 90° C. An IR spectrum of the resulting liquid product displays an absence of hydroxyl absorbance and characteristic carbonyl absorbance of the corresponding acetate intermediate.

EXAMPLE 30A

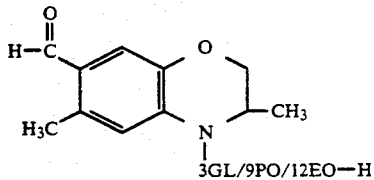
3GL/9PO/12EO—H

A dry 2000 ml three-neck flask is charged with 181 grams N,N-dimethylformamide under nitrogen and cooled to 0° C. One hundred ninety-two grams of phosphorous oxychloride are added dropwise at less than 10° C. with mechanical stirring and cooling over one hour. The resulting mixture is stirred for an additional two hours at 0°-5° C. Then 1490 grams (1 mole) of the benzomorpholine 3GL/9PO/12EO acetate intermediate from Example 30 are added dropwise. The reaction mixture is gradually heated to 90° C. and held at this temperature for an additional two hours to insure complete reaction. After cooling, the mixture is diluted with an equal amount of ice and 2.5 moles of sodium hydroxide (50 percent by weight). The resulting mixture is heated at 50°-60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The metyylene chloride solution is filtered and the solvent is removed under reduced pressure at 90° C. The resulting liquid has a maximum absorbance at 356 nm. An IR spectrum of the resulting liquid product displays both the presence of hydroxyl absorbance and characteristic carbonyl absorbance of the corresponding formyl intermediate.

EXAMPLE 31

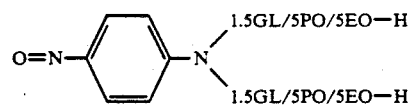

A mixture is prepared by charging 1349 grams (1 mole) of aniline 3GL/10PO/10EO-H intermediate of Example 1A, along with 400 ml of concentrated hydrochloric acid and 100 ml of water in a 3000 ml three-neck flask. The mixture is stirred mechanically and cooled to 0° C. A solution of 76 grams (1.1 moles) of sodium nitrite dissolved in 300 ml of water is then added dropwise over one and a half hours maintaining the temperature below 0° C. The mixture is allowed to warm to room temperature and stirred for an additional two hours. The excess nitrite is then destroyed by pulling a vacuum for an additional 30 minutes. After cooling to 0° C., the mixture is neutralized with dilute sodium hydroxide solution and the product extracted into methylene chloride. The methylene chloride layer is phase separated and dried over anhydrous magnesium sulfate. The methylene chloride solution is filtered and the solvent is removed under reduced pressure at 90° C. The resulting liquid has a maximum absorbance at 427 nm. An IR spectrum of the resulting liquid product displays a characteristic nitroso absorbance.

EXAMPLE 32

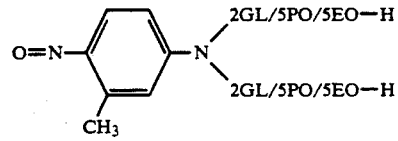

A mixture is prepared by charging 1349 grams (1 mole) of m-toluidine 4GL/10PO/10EO-H intermediate of Example 2A, along with 400 ml of concentrated hydrochloric acid and 100 ml of water in a 3000 ml three neck flask. The mixture is stirred mechanically and cooled to 0° C. A solution of 76 grams (1.1 moles) of sodium nitrite dissolved in 300 ml of water is then added dropwise over one and a half hours maintaining the temperature below 0° C. The mixture is allowed to warm to room temperature and stirred for an additional two hours. The excess nitrite is then destroyed by pulling a vacuum for an additional 30 minutes. After cooling to 0° C., the mixture is neutralized with dilute sodium hydroxide solution and the product extracted into methylene chloride. The methylene chloride layer is phase separated and dried over anhydrous magnesium sulfate. The methylene chloride solution is filtered and the solvent is removed under reduced pressure at 90° C. The resulting liquid has a maximum absorbance at 427 nm. An IR spectrum of the resulting liquid product displays a characteristic nitroso absorbance.

EXAMPLE 33

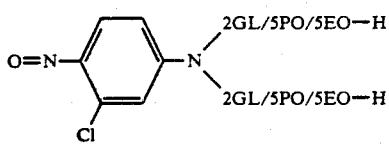

A mixture is prepared by charging 1470 grams (1 mole) of m-chloroaniline 4GL/10PO/10EO-H intermediate of Example 5A, along with 400 ml of concentrated hydrochloric acid and 100 ml of water in a 3000 ml three neck flask. The mixture is stirred mechanically and cooled to 0° C. A solution of 76 grams (1.1 moles) of sodium nitrite dissolved in 300 ml of water is then added dropwise over one and a half hours maintaining the temperature below 0° C. The mixture is allowed to warm to room temperature and stirred for an additional two hours. The excess nitrite is then destroyed by pulling a vacuum for an additional 30 minutes. After cooling to 0° C., the mixture is neutralized with dilute sodium hydroxide solution and the product extracted into methylene chloride. The methylene chloride layer is phase separated and dried over anhydrous magnesium sulfate. The methylene chloride solution is filtered and the solvent is removed under reduced pressure at 90° C. An IR spectrum of the resulting liquid product displays a characteristic nitroso absorbance.

EXAMPLE 34

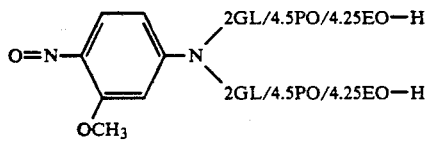

A mixture is prepared by charging 1384 grams (1 mole) of m-anisidine 4GL/9PO/8.5EO-H intermediate of Example 6A, along with 400 ml of concentrated hydrochloric acid and 100 ml of water in a 3000 ml three neck flask. The mixture is stirred mechanically and cooled to 0° C. A solution of 76 grams (1.1 moles) of sodium nitrite dissolved in 300 ml of water is then added dropwise over one and a half hours maintaining the temperature below 0° C. The mixture is allowed to warm to room temperature and stirred for an additional two hours. The excess nitrite is then destroyed by pulling a vacuum for an additional 30 minutes. After cooling to 0° C., the mixture is neutralized with dilute sodium hydroxide solution and the product extracted into methylene chloride. The methylene chloride layer is phase separated and dried over anhydrous magnesium sulfate. The methylene chloride solution is filtered and the solvent is removed under reduced pressure at 90° C. An IR spectrum of the resulting liquid product displays a characteristic nitroso absorbance.

EXAMPLE 35

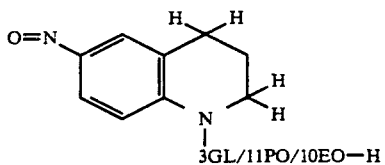

A mixture is prepared by charging 1402 grams (1 mole) of tetrahydroquinoline 3GL/11PO/10EO-H intermediate of Example 9A, along with 400 ml of concentrated hydrochloric acid and 100 ml of water in a 3000 ml three neck flask. The mixture is stirred mechanically and cooled to 0° C. A solution of 76 grams (1.1 moles) of sodium nitrite dissolved in 300 ml of water is then added dropwise over one and a half hours maintaining the temperature below 0° C. The mixture is allowed to warm to room temperature and stirred for an additional two hours. The excess nitrite is then destroyed by pulling a vacuum for an additional 30 minutes. After cooling to 0° C., the mixture is neutralized with dilute sodium hydroxide solution and the product extracted into methylene chloride. The methylene chloride layer is phase separated and dried over anhydrous magnesium sulfate. The methylene chloride solution is filtered and the solvent is removed under reduced pressure at 90° C. An IR spectrum of the resulting liquid product displays a characteristic nitroso absorbance.

EXAMPLE 36

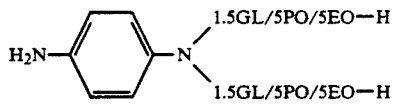

In a 2000 milliter autoclave are charged 1378 grams (1 mole) of nitrosoaniline 3GL/10PO/10EO-H intermediate of Example 31, 600 milliters of ethyl alcohol and 130 grams of wet Raney nickel catalyst. The autoclave is then purged three times with hydrogen gas and heated to 85°-90° C. at a pressure of about 1300 psi. After about two hours the hydrogen uptake ceases. A sample is removed and vacuum stripped of solvent. The IR spectrum of this sample shows no nitroso bands and the presence of an amine band indicating that the reaction is complete. The autoclave is cooled and vented. The liquid product is isolated by filtering the reaction mixture and stripping away the solvent under reduced pressure.

EXAMPLE 37

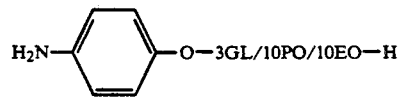

In a 2000 milliter autoclave are charged 1381 grams (1 mole) of 4-nitro 3GL/10PO/10EO-H intermediate of Example 16A, 600 milliters of ethyl alcohol and 130 grams of wet Raney nickel catalyst. The autoclave is then purged three times with hydrogen gas and heated to 85°-90° C. at a pressure of about 1300 psi. After about two hours the hydrogen uptake ceases. A sample is removed and vacuum stripped of solvent. The IR spectrum of this sample shows no nitro bands and the presence of an amine band indicating that the reaction is complete. The autoclave is cooled and vented. The liquid product is isolated by filtering the reaction mixture and stripping away the solvent under reduced pressure.

EXAMPLE 38

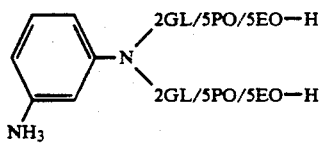

In a 2000 milliter autoclave are charged 1454 grams (1 mole) of 3-nitroaniline 4GL/10PO/10EO-H intermediate of Example 15A, 600 milliters of ethyl alcohol and 130 grams of wet Raney nickel catalyst. The autoclave is then purged three times with hydrogen gas and heated to 85°-90° C. at a pressure of about 1300 psi. After about two hours the hydrogen uptake ceases. A sample is removed and vacuum stripped of solvent. The IR spectrum of this sample shows no nitro bands and the presence of an amine band indicating that the reaction is complete. The autoclave is cooled and vented. The liquid product is isolated by filtering the reaction mixture and stripping away the solvent under reduced pressure.

EXAMPLE 39

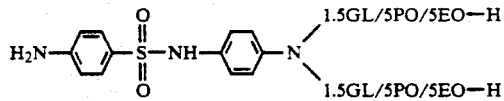

A mixture is prepared by adding 1378 grams (1 mole) of the aminoaniline 3GL/10PO/10EO-H intermediate of Example 36 to 122 grams (1.2 moles) sodium carbonate in 1000 ml of water. The mixture is cooled to 10°-15° C. and 233 grams (1 mole) of 4-acetamidobenzenesulfonyl chloride are added to the mixture over one half hour. After the addition is complete, the mixture is warmed at 50° C. for an additional two hours to insure complete reaction. Forty grams (1 mole) of sodium hydroxide are added to the mixture and the mixture is heated at reflux one hour. Afterwards, the mixture is cooled and the product is extracted into methylene chloride, further washed several times with water to a neutral pH, and dried over anhydrous magnesium sulfate. The dried solution is filtered and stripped under reduced pressure at 90° C. to yield a liquid intermediate.

EXAMPLE 40

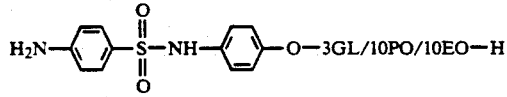

A mixture is prepared by adding 1351 grams (1 mole) of the amine 3GL/10PO/10EO-H intermediate of Example 37 to 122 grams (1.2 moles) sodium carbonate in 1000 ml of water. The mixture is cooled to 10°-15° C. and 233 grams (1 mole) of 4-acetamidobenzenesulfonyl chloride are added to the mixture over one half hour. After the addition is complete, the mixture is warmed at 50° C. for an additional two hours to insure complete reaction. Forty grams (1 mole) of sodium hydroxide are added to the mixture and the mixture is heated at reflux one hour. Afterwards, the mixture was cooled and the product is extracted into methylene chloride, further washed several times with water to a neutral pH, and dried over anhydrous magnesium sulfate. The dried solution is filtered and stripped under reduced pressure at 90° C. to yield a liquid intermediate.

EXAMPLE 41

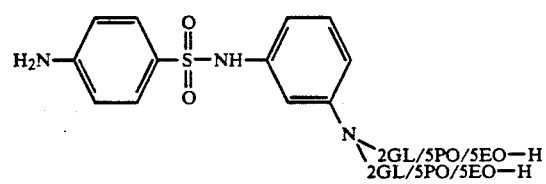

A mixture is prepared by adding 1424 grams (1 mole) of the aminoaniline 4GL/10PO/10EO-H intermediate of Example 38 to 122 grams (1.2 moles) sodium carbonate in 1000 ml of water. The mixture is cooled to 10°-15° C. and 233 grams (1 mole) of 4-acetamidobenzenesulfonyl chloride are added to the mixture over one half hour. After the addition is complete, the mixture is warmed at 50° C. for an additional two hours to insure complete reaction. Forty grams (1 mole) of sodium hydroxide are added to the mixture and the mixture is heated at reflux one hour. Afterwards, the mixture was cooled and the product is extracted into methylene chloride. The corresponding methylene chloride solution is separated from the salt water solution, further washed several times with water to a neutral pH, and dried over anhydrous magnesium sulfate. The dried solution is filtered and stripped under reduced pressure at 90° C. to yield a liquid intermediate.

EXAMPLE 42

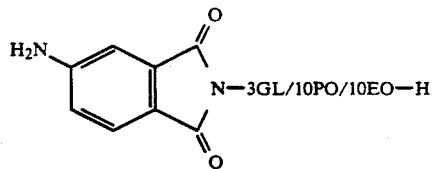

In a 2000 milliter autoclave are charged 405 grams (0.5 moles) of 4-nitrophthalimide 3GL/10PO/10EO-H intermediate of Example 17A, 1400 milliliters of ethyl alcohol and 65 grams of wet Raney nickel catalyst. The autoclave is then purged three times with hydrogen gas and heated to 85°-90° C. at a pressure of about 1300 psi. After about two hours the hydrogen uptake ceases. A sample is removed and vacuum stripped of solvent. The IR spectrum of this sample shows no nitro bands and the presence of an amine band indicating that the reaction is complete. The autoclave is cooled and vented. The liquid product is isolated by filtering the reaction mixture and stripping away the solvent under reduced pressure.

EXAMPLE 43

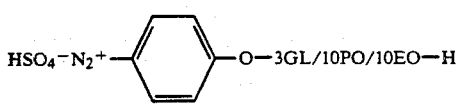

One hundred eighty grams acetic acid, 41 grams propionic acid, and 4 drops of 2-ethyl hexanol defoamer are added to a 500 milliliter three necked flask equipped with a thermometer, cooling bath, and mechanical stirrer. The mixture is cooled and 135 grams (0.1 mole) of amine 3GL/10PO/10EO-H intermediate of Example 37 are added to the flask. The mixture is further cooled to below 5° C. after which 33 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour. At this point the diazo intermediate is ready for further use.

EXAMPLE 44

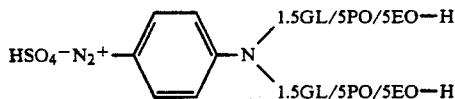

One hundred eighty grams acetic acid, 41 grams propionic acid, and 4 drops of 2-ethyl hexanol defoamer are added to a 500 milliliter three necked flask equipped with a thermometer, cooling bath, and mechanical stirrer. The mixture is cooled and 139 grams (0.1 mole) of aminoaniline 3GL/10PO/10EO-H intermediate of Example 36 are added to the flask. The mixture is further cooled to below 5° C. after which 33 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour. At this point the diazo intermediate is ready for further use.

EXAMPLE 45

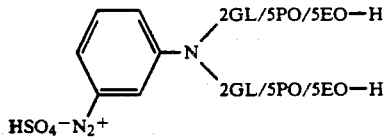

One hundred eighty grams acetic acid, 41 grams propionic acid, and 4 drops of 2-ethyl hexanol defoamer are added to a 500 milliliter three necked flask equipped with a thermometer, cooling bath, and mechanical stirrer. The mixture is cooled and 142 grams (0.1 mole) of aminoaniline 4GL/10PO/10EO-H intermediate of Example 38 are added to the flask. The mixture is further cooled to below 5° C. after which 33 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

At this point the diazo intermediate is ready for further use.

EXAMPLE 46

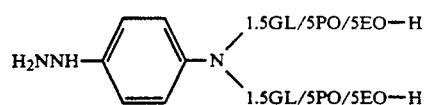

A solution of 170.5 grams (0.125 mole) of amine 3GL/10PO/10EO-H intermediate of Example 36, 45 milliters concentrated hydrochloric acid, and 90 milliters of water is added to a 500 milliter flask and cooled to 0°-5° C. Ten grams of sodium nitrite are added maintaining the mixture below 10° C. After several hours, the excess nitrite is destroyed with sulfamic acid. The diazo solution is then dripped into a solution of 94 grams of sodium sulfite in 250 grams of water, stirred for one hour at room temperature and then 50 grams of concentrated sulfuric acid are added and the mixture heated for one hour at 100° C. After cooling, the pH is adjusted with sodium hydroxide to 10. The organic layer is separated and extracted into methylene chloride. The methylene chloride solution is separated from the salt water solution, further washed several times with water to a neutral pH, and dried over anhydrous magnesium sulfate. The dried solution is filtered and stripped under reduced pressure at 90° C. to yield a liquid intermediate.

EXAMPLE 47

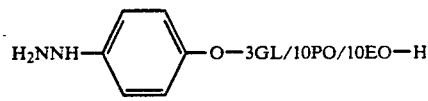

A solution of 168.9 grams (0.125 mole) of amine 3GL/10PO/10EO-H intermediate of Example 37, 45 milliters concentrated hydrochloric acid, and 90 milliters of water is added to a 500 milliter flask and cooled to 0°-5° C. Ten grams of sodium nitrite are added maintaining the mixture below 10° C. After several hours, the excess nitrite is destroyed with sulfamic acid. The diazo solution is then dripped into a solution of 94 grams of sodium sulfite in 250 grams of water, stirred for one hour at room temperature and then 50 grams of concentrated sulfuric acid are added and the mixture heated for one hour at 100° C. After cooling, the pH is adjusted with sodium hydroxide to 10. The organic layer is separated and extracted into methylene chloride. The methylene chloride solution is separated from the salt water solution, further washed several times with water to a neutral pH, and dried over anhydrous magnesium sulfate. The dried solution is filtered and stripped under reduced pressure at 90° C. to yield a liquid intermediate.

EXAMPLE 48

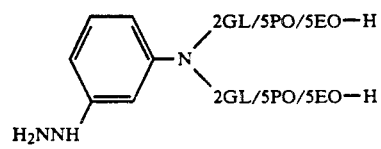

A solution of 178 grams (0.125 mole) of aminoaniline 4GL/10PO/10EO-H intermediate of Example 38, 45 milliters concentrated hydrochloric acid, and 90 milliters of water is added to a 500 milliter flask and cooled to 0°–5° C. Ten grams of sodium nitrite are added maintaining the mixture below 10° C. After several hours, the excess nitrite is destroyed with sulfamic acid. The diazo solution is then dripped into a solution of 94 grams of sodium sulfite in 250 grams of water, stirred for one hour at room temperature and then 50 grams of concentrated sulfuric acid are added and the mixture heated for one hour at 100° C. After cooling, the pH is adjusted with sodium hydroxide to 10. The organic layer is separated and extracted into methylene chloride. The methylene chloride solution is separated from the salt water solution, further washed several times with water to a neutral pH, and dried over anhydrous magnesium sulfate. The dried solution is filtered and stripped under reduced pressure at 90° C. to yield a liquid intermediate.

TABLE 1

| Entry | Q | $R_{16}$ | $R_{17}$ | $R_{18}$ |
|---|---|---|---|---|
| 1 | H | H | $C_2H_5$ | 2GL/10PO/10EO—H |
| 2 | H | H | $C_6H_{11}$ | 4GL/10PO/10EO—H |
| 3 | H | 3-$CH_3$ | $CH_2CH=CH_2$ | 3GL/10PO/10EO—H |
| 4 | H | 3-$CH_3$ | 5GL/5PO/5EO—H | 5GL/5PO/5EO—H |
| 5 | CHO | 3-$CH_3$ | $CH_2C_6H_5$ | 3GL/15BO/6EO—H |
| 6 | H | 2-$CH_3$ | $CH_3$ | 4GL/20PO/10EO—H |
| 7 | H | 2-$OCH_3$ | $C_2H_4C_6H_5$ | 2GL/20BO/10EO—H |
| 8 | H | 2-$OCH_3$, 5-$CH_3$ | 2GL/10PO/5EO—H | 2GL/10PO/5EO—H |
| 9 | $N_2^+Cl^-$ | 3-$OCH_3$ | 3GL/20PO/5EO—H | 3GL/20PO/5EO—H |
| 10 | H | 3-$CF_3$ | 2GL/10BO/5EO—H | 2GL/10BO/5EO—H |
| 11 | H | 3-Cl | 2GL/5BO/2EO—H | 2GL/5BO/2EO—H |
| 12 | CHO | H | $C_6H_{10}$-4-$CH_3$ | 4GL/30PO/10EO—H |
| 13 | CHO | H | $C_6H_4$-4-$OCH_3$ | 3GL/40PO/10EO—H |
| 14 | CHO | 3-$CH_3$ | $C_6H_4$-3-Cl | 4GL/8PO/8EO—H |
| 15 | NO | 3-$CH_3$ | $C_6H_4$-3-$CO_2C_2H_5$ | 6GL/5PO/10EO—H |
| 16 | $NH_2$ | 3-$CH_3$ | $C_6H_4$-4-CN | 6GL/15PO/5EO—H |
| 17 | NO | H | $C_2H_4C_6H_5$ | 4GL/40PO/40EO—H |
| 18 | $NH_2$ | H | $C_2H_4OC_6H_5$ | 3GL/50PO/60EO—H |
| 19 | $COCH_3$ | H | $C_2H_4SC_6H_5$ | 2.5GL/10PO/10EO—H |
| 20 | $NH-NH_2$ | H | $C_2H_4OC_2H_5$ | 3GL/15BO/10EO—H |
| 21 | $NO_2$ | H | $C_2H_4SC_2H_5$ | 3GL/10PO/15EO—H |
| 22 | H | 3-$OC_6H_5$ | $C_3H_6SO_2CH_3$ | 3GL/25PO/25EO—H |
| 23 | H | 3-$SC_6H_5$ | $C_2H_4OC_2H_4OC_2H_5$ | 6GL/25PO/35EO—H |
| 24 | H | 2,5-di-Cl | $C_2H_4CN$ | 6GL/10PO/10EO—H |
| 25 | H | 2,5-di-$CH_3$ | $CH_2C_6H_{11}$ | 4GL/10PO/10EO—H |
| 26 | $NH-NH_2$ | H | $CH_2CH_2Cl$ | 4GL/15PO/15EO—H |
| 27 | $COCH_3$ | 3-$CH_3$ | $C_2H_4OCOCH_3$ | 3GL/40PO/20EO—H |
| 28 | $NO_2$ | 3-$CH_3$ | $C_2H_4N(SO_2CH_3)CH_3$ | 3GL/10PO/10EO—H |
| 29 | $NH_2$ | 3-$CH_3$ | $C_2H_4CON(C_2H_5)_2$ | 4GL/10PO/10EO—H |
| 30 | NO | 3-$CH_3$ | $C_2H_4SO_2N(CH_3)_2$ | 5GL/15PO/15EO—H |
| 31 | CHO | 3-$CH_3$ | $C_2H_4SO_2N(CH_3)C_6H_5$ | 4GL/11PO/10EO—H |
| 32 | $N_2^+Cl^-$ | 3-$CH_3$ | $C_2H_4SO_2(CH_3)C_6H_{11}$ | 3GL/8PO/18EO—H |
| 33 | $-N=CH-C_6H_5$ | 3-$CH_3$ | $C_2H_4N(SO_2C_6H_5)C_2H_5$ | 3GL/16PO/5EO—H |
| 34 | CHO | 3-$CH_3$ | $C_2H_4OCONHC_6H_5$ | 4GL/14PO/20EO—H |
| 35 | $COC_6H_5$ | 3-$CH_3$ | $C_2H_4SO_2C_6H_5$ | 3GL/19PO/30EO—H |
| 36 | $NH-NH_2$ | 3-$CH_3$ | $C_2H_4OCO_2C_2H_5$ | 3GL/50PO/50EO—H |
| 37 | $NO_2$ | 3-$CH_3$ | $C_2H_4SO_2CH=CH_2$ | 4GL/20PO/80EO—H |
| 38 | NO | 3-$CH_3$ | $C_2H_4OCOC_6H_5$ | 3GL/50PO/50EO—H |
| 39 | CHO | 3-$CH_3$ | $CH_2CH(OCH_3)CH_2OCH_3$ | 3GL/29PO/18EO—H |
| 40 | CHO | 3-$CH_3$ | $C_2H_4OCON(CH_3)_2$ | 4GL/10BO/EO—H |

TABLE 2

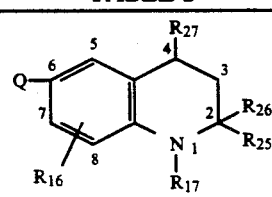

| Entry | Q | $R_{16}$ | $R_{25}$ | $R_{26}$ | $R_{27}$ | $R_{17}$ |
|---|---|---|---|---|---|---|
| 1 | H | H | H | H | H | 2GL/10PO/10EO—H |
| 2 | CHO | H | $CH_3$ | H | H | 4GL/10PO/10EO—H |
| 3 | NO | H | $C_2H_5$ | H | H | 3GL/10PO/10EO—H |
| 4 | H | H | $CH_3$ | H | H | 5GL/5PO/5EO—H |
| 5 | CHO | H | $CH_3$ | $CH_3$ | $CH_3$ | 3GL/15BO/6EO—H |
| 6 | NO | 7-$CH_3$ | $CH_3$ | H | H | 4GL/20PO/10EO—H |

TABLE 2-continued

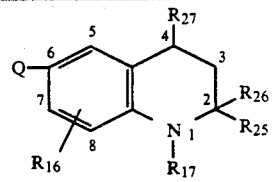

| Entry | Q | R16 | R25 | R26 | R27 | R17 |
|---|---|---|---|---|---|---|
| 7 | $N_2^+Cl^-$ | 7-CH3 | CH3 | H | H | 2GL/20BO/10EO—H |
| 8 | NH2 | 7-CH3 | CH3 | CH3 | CH3 | 2GL/10PO/5EO—H |
| 9 | H | 5-CH3, 8-OCH3 | CH3 | H | H | 3GL/20PO/5EO—H |
| 10 | H | 5-CH3, 8-OCH3 | CH3 | CH3 | CH3 | 2GL/10BO/5EO—H |
| 11 | NO | 8-OCH3 | CH3 | H | H | 2GL/5BO/2EO—H |
| 12 | CHO | 8-OCH3 | CH3 | CH3 | CH3 | 4GL/30PO/10EO—H |
| 13 | CHO | 5,8-di-OCH3 | CH3 | H | H | 3GL/40PO/10EO—H |
| 14 | NO | 5,8-di-OCH3 | CH3 | H | H | 4GL/8PO/8EO—H |
| 15 | H | 7-Cl | CH3 | H | H | 6GL/5PO/10EO—H |
| 16 | NH—NH2 | 7-OCH3 | CH3 | H | H | 6GL/15PO/5EO—H |
| 17 | NO2 | 7-OC2H5 | CH3 | H | H | 4GL/40PO/40EO—H |
| 18 | COCH3 | 7-CF3 | CH3 | H | H | 3GL/50PO/60EO—H |
| 19 | H | 7-CH3 | CH3 | H | H | C2H4SO2NHC6H4—O-3GL/10PO/5EO—H |
| 20 | —N=CH—C6H5 | 7-CH3 | CH3 | H | H | CH2C6H4SO2C6H4—O-4GL/15PO/4EO— |

TABLE 3

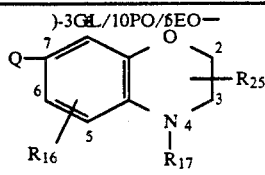

| Entry | Q | R16 | R25 | R17 |
|---|---|---|---|---|
| 1 | H | H | H | 2GL/10PO/10EO—H |
| 2 | H | H | 2-CH3 | 4GL/10PO/10EO—H |
| 3 | CHO | H | 2-CH3 | 3GL/10PO/15EO—H |
| 4 | NO | H | H | 3GL/25PO/25EO—H |
| 5 | H | 6-CH3 | H | 6GL/25PO/35EO—H |
| 6 | H | 6-CH3 | 3-CH3 | 6GL/10PO/10EO—H |
| 7 | CHO | 6-CH3 | 3-CH3 | 4GL/10PO/10EO—H |
| 8 | NO | 6-CH3 | 3-CH3 | 4GL/15PO/15EO—H |
| 9 | NH2 | 6-CH3 | H | 3GL/40PO/20EO—H |
| 10 | NO2 | H | H | 3GL/10PO/10EO—H |
| 11 | —N=CH—C6H5 | H | 3-CH3 | 4GL/10PO/10EO—H |
| 12 | H | 6-OCH3 | 3-CH3 | 5GL/15PO/15EO—H |
| 13 | H | 6-Cl | 3-CH3 | 4GL/11PO/10EO—H |
| 14 | $N_2^+Cl^-$ | H | H | 3GL/8PO/18EO—H |
| 15 | H | 6,8-di-CH3 | 3-CH3 | 3GL/16PO/5EO—H |
| 16 | $N_2^+Cl^-$ | H | 3-CH3 | 4GL/14PO/20EO—H |
| 17 | H | 6-CH3 | 3-CH3 | 3GL/19PO/30EO—H |
| 18 | COCH3 | H | 3-CH3 | 3GL/50PO/50EO—H |
| 19 | COCH3 | H | 3-CH3 | 4GL/20PO/80EO—H |
| 20 | NH—NH2 | H | 3-CH3 | 3GL/50PO/50EO—H |
| 21 | H | 6-CH3 | 3-CH3 | C2H4SO2N(CH3)-3BL/10PO/5EO—H |
| 22 | H | 6-CH3 | 3-CH3 | C2H4S-4GL/20BO/10EO-H |

TABLE 4

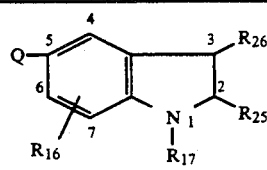

| Entry | Q | R16 | R25 | R26 | R17 |
|---|---|---|---|---|---|
| 1 | H | H | H | H | 2GL/10PO/10EO—H |
| 2 | H | H | CH3 | H | 4GL/10PO/10EO—H |
| 3 | CHO | H | CH3 | H | 3GL/10PO/10EO—H |
| 4 | CHO | H | CH3 | H | 5GL/5PO/5EO—H |
| 5 | NO | H | CH3 | H | 3GL/15BO/6EO—H |
| 6 | H | 6-CH3 | CH3 | CH3 | 4GL/20PO/10EO—H |
| 7 | NH2 | 6-CH3 | CH3 | H | 2GL/20BO/10EO—H |
| 8 | NO2 | 6-CH3 | CH3 | H | 2GL/10PO/5EO—H |

TABLE 4-continued

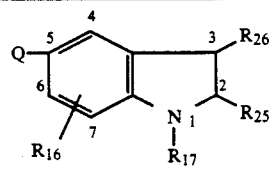

| Entry | Q | R16 | R25 | R26 | R17 |
|---|---|---|---|---|---|
| 9 | H | 4,6-di-CH3 | CH3 | H | 3GL/20PO/5EO—H |
| 10 | H | 6-OCH3 | CH3 | H | 2GL/10BO/5EO—H |
| 11 | H | 6-Cl | CH3 | H | 2GL/5BO/2EO—H |
| 12 | H | 6-C2H5 | CH3 | H | 4GL/30PO/10EO—H |
| 13 | NO | 6-CH3 | CH3 | H | 3GL/40PO/10EO—H |
| 14 | NH2 | 6-CH3 | CH3 | H | 4GL/8PO/8EO—H |
| 15 | N2+Cl− | H | CH3 | H | 6GL/5PO/10EO—H |
| 16 | NH—NH2 | H | CH3 | H | 6GL/15PO/5EO—H |
| 17 | —N=CH—C6H5 | H | CH3 | H | 4GL/40PO/40EO—H |
| 18 | COCH3 | H | CH3 | H | C2H4OC6H4-4-O-3GL/10PO/15EO—H |
| 19 | COC6H5 | H | CH3 | H | CH2CH(CH3)O-3GL/10PO/5EO—H |
| 20 | CHO | H | CH3 | H | C3H6O-4GL/15PO/4EO— |

TABLE 5

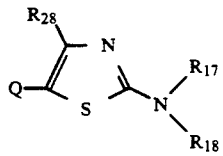

| Entry | Q | R17 | R18 | R28 |
|---|---|---|---|---|
| 1 | H | 2GL/10PO/10EO—H | 2GL/10PO/10EO—H | C6H5 |
| 2 | CHO | 4GL/10PO/10EO—H | 4GL/10PO/10EO—H | C6H5 |
| 3 | NO | 3GL/10PO/10EO—H | 3GL/10PO/10EO—H | CH3 |
| 4 | NH2 | 5GL/5PO/5EO—H | 5GL/5PO/5EO—H | CH3 |
| 5 | N2+Cl− | 3GL/15BO/6EO—H | 3GL/15BO/6EO—H | C6H11 |
| 6 | H | 4GL/20PO/10EO—H | 4GL/20PO/10EO—H | C6H4-4-CH3 |
| 7 | H | C6H5 | 2GL/20BO/10EO—H | C6H4-4-CH3 |
| 8 | NO | CH2C6H5 | 2GL/10PO/5EO—H | C6H4-4-OCH3 |
| 9 | CHO | CH3 | 3GL/20PO/5EO—H | C6H4-4-Cl |
| 10 | NH2 | CH3 | 2GL/10BO/5EO—H | C6H5 |
| 11 | NO2 | 2GL/5BO/2EO—H | 2GL/5BO/2EO—H | C6H5 |
| 12 | CHO | CH3 | 4GL/30PO/10EO—H | CH3 |
| 13 | NH—NH2 | C2H5 | 3GL/40PO/10EO—H | 2-thienyl |
| 14 | —N=CH—C6H5 | CH3 | 4GL/8PO/8EO—H | 5-Cl-2-thienyl |
| 15 | H | CH3 | C6H4-4-C2H4O-3GL/10PO/5EO—H | CH3 |
| 16 | CHO | CH3 | C2H4O-4GL/15BO/10EO—H | CH3 |
| 17 | COCH3 | H | C2H4N(SO2CH3)-3GL/10PO/10EO—H | C6H5 |
| 18 | COC6H5 | 3GL/50PO/60EO—H | 3GL/50PO/60EO—H | C6H5 |
| 19 | NO | 3GL/10PO/10EO—H | 3GL/10PO/10EO—H | CH3 |
| 20 | CHO | C2H5 | 3GL/15BO/10EO—H | C6H5 |

TABLE 6

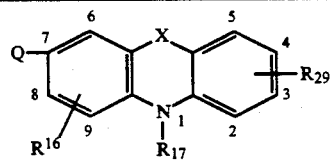

| Entry | Q | R16 | R17 | X | R29 |
|---|---|---|---|---|---|
| 1 | H | H | 2GL/10PO/10EO—H | CB* | H |
| 2 | CHO | H | 4GL/10PO/10EO—H | CB* | H |
| 3 | NO | 8-CH3 | 4GL/11PO/11EO—H | CB* | H |
| 4 | NH2 | 8-CH3 | 5GL/5PO/5EO—H | CB* | H |
| 5 | H | 8-CH3 | 3GL/15BO/6EO—H | CB* | 4-OCH3 |
| 6 | H | H | 4GL/20PO/10EO—H | O | 3,4-di-Cl |
| 7 | H | H | 2GL/20BO/10EO—H | O | 2-Cl |
| 8 | H | 8-CH3 | 2GL/10PO/5EO—H | O | 3-OCH3 |
| 9 | N2+Cl− | 8-CH3 | 3-GL/20PO/5EO—H | S | H |
| 10 | NO | 8-CH3 | 2GL/10BO/5EO—H | S | H |
| 11 | H | 5,8-di-CH3 | 2GL/5BO/2EO—H | S | H |
| 12 | NH2 | H | 4GL/30PO/10EO—H | S | H |
| 13 | NH—NH2 | 8-CH3 | 3GL/40PO/10EO—H | O | H |

TABLE 6-continued

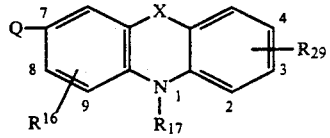

| Entry | Q | $R_{16}$ | $R_{17}$ | X | $R_{29}$ |
|---|---|---|---|---|---|
| 14 | H | 8-$CH_3$ | 4GL/8PO/8EO—H | O | 4-$OCH_3$ |
| 15 | $NO_2$ | H | 6GL/5PO/10EO—H | O | H |
| 16 | $COCH_3$ | H | 6GL/15PO/5EO—H | O | H |
| 17 | $COC_6H_5$ | H | 4GL/40PO/40EO—H | O | H |
| 18 | —N=CH—$C_6H_5$ | 8-$CH_3$ | 5GL/20BO/5EO—H | O | H |
| 19 | H | 8-$CH_3$ | $C_2H_4$O-4GL/15PO/10EO—H | O | H |
| 20 | CHO | 8-$CH_3$ | 4GL/15PO/4EO—H | O | H |

*covalent bond

TABLE 7

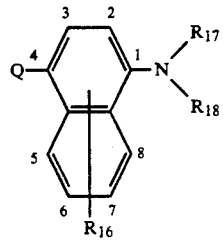

| Entry | Q | $R_{16}$ | $R_{17}$ | $R_{18}$ |
|---|---|---|---|---|
| 1 | H | H | 2GL/10PO/10EO—H | 2GL/10PO/10EO—H |
| 2 | CHO | H | $C_2H_5$ | 4GL/10PO/10EO—H |
| 3 | $NH_2$ | 2-$CH_3$ | $CH_2CH=CH_2$ | 3GL/10PO/10EO—H |
| 4 | H | 2-$CH_3$ | 5GL/5PO/5EO—H | 5GL/5PO/5EO—H |
| 5 | H | 5-O-3GL/5BO/16EO—H | $C_2H_5$ | H |
| 6 | H | 2-$CH_3$ | $CH_3$ | 4GL/20PO/10EO—H |
| 7 | H | 2-$OCH_3$ | $C_2H_4C_6H_5$ | 2GL/20BO/10EO—H |
| 8 | H | 2-$OCH_3$, 6-$CH_3$ | 2GL/10PO/5EO—H | 2GL/10PO/5EO—H |
| 9 | H | 3-$OCH_3$ | 3GL/20PO/5EO—H | 3GL/20PO/5EO—H |
| 10 | $N_2^+Cl^-$ | H | H | $C_2H_4SO_2NH$-2GL/10BO/5EO—H |
| 11 | NH—$NH_2$ | H | 2GL/5BO/2EO—H | 2GL/5BO/2EO—H |
| 12 | $COCH_3$ | H | $C_6H_{10}$-4-$CH_3$ | 4GL/30PO/10EO—H |
| 13 | $COC_6H_5$ | H | $C_6H_4$-4-$OCH_3$ | 3GL/40PO/10EO—H |
| 14 | —N=CH—$C_6H_5$ | 2-$CH_3$ | $C_6H_4$-3-Cl | 4GL/8PO/8EO—H |
| 15 | H | 2-$CH_3$ | 6GL/5PO/10EO—H | 6GL/5PO/10EO—H |
| 16 | H | 5-$OCH_3$ | 6GL/15PO/5EO—H | 6GL/15PO/5EO—H |
| 17 | NO | H | 4GL/40PO/40EO—H | 4GL/40PO/40EO—H |
| 18 | $NH_2$ | H | $C_2H_4OC_6H_5$ | 3GL/50PO/60EO—H |
| 19 | $N_2^+Cl^-$ | H | $C_2H_4SC_6H_5$ | 2.5GL/10PO/10EO—H |
| 20 | CHO | H | $C_2H_4OC_2H_5$ | 3GL/15BO/10EO—H |

TABLE 8

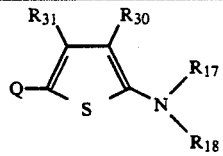

| Entry | Q | $R_{17}$ | $R_{18}$ | $R_{30}$ | $R_{31}$ |
|---|---|---|---|---|---|
| 1 | H | 2GL/10PO/10EO—H | 2GL/10PO/10EO—H | H | H |
| 2 | CHO | 4GL/10PO/10EO—H | 4GL/10PO/10EO—H | H | H |
| 3 | $COCH_3$ | 3GL/10PO/10EO—H | 3GL/10PO/10EO—H | H | $CH_3$ |
| 4 | NO | 5GL/5PO/5EO—H | 5GL/5PO/5EO—H | H | $C_6H_5$ |
| 5 | $NH_2$ | 2GL/6PO/6EO—H | 2GL/6PO/6EO—H | H | $CH_3$ |
| 6 | $N_2^+Cl^-$ | 3GL/12PO/12EO—H | $C_2H_5$ | $CO_2C_2H_5$ | $CH_3$ |
| 7 | NH—$NH_2$ | 4GL/15PO/15EO—H | $CH_3$ | CN | $CH_3$ |
| 8 | $NO_2$ | 3GL/20PO/20EO—H | $C_2H_5$ | $SO_2CH_3$ | $CH_3$ |
| 9 | CHO | 4GL/11PO/12EO—H | $CH_3$ | $CONH_2$ | $CH_3$ |
| 10 | NO | 2GL/7PO/7EO—H | 2GL/7PO/7EO—H | $SO_2C_6H_5$ | $CH_3$ |
| 11 | $NH_2$ | 3GL/20PO/5EO—H | $CH_3$ | $CONHC_2H_5$ | $CH_3$ |
| 12 | H | 4GL/30PO/10EO—H | 4GL/30PO/10EO—H | H | $C_6H_5$ |
| 13 | H | 3GL/40PO/10EO—H | $C_2H_5$ | $CONHC_2H_4OH$ | $C_6H_5$ |

TABLE 8-continued

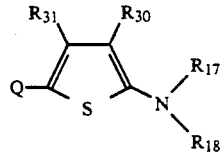

| Entry | Q | R17 | R18 | R30 | R31 |
|---|---|---|---|---|---|
| 14 | CHO | 4GL/8PO/8EO—H | 4GL/8PO/8EO—H | H | CH3 |
| 15 | —N=CH—C6H5 | 6GL/5PO/10EO—H | CH3 | H | CH3 |
| 16 | NH2 | 6GL/15PO/5EO—H | CH2C6H5 | H | CH3 |
| 17 | NO | 4GL/40PO/40EO—H | 4GL/40PO/40EO—H | H | C6H5 |
| 18 | NH—NH2 | 3GL/10PO/15EO—H | 3GL/10PO/15EO—H | H | CH3 |
| 19 | CHO | 5GL/10PO/5EO—H | 5GL/10PO/5EO—H | H | CH3 |
| 20 | COC6H5 | 4GL/15PO/4EO—H | CH3 | H | C6H5 |

TABLE 9

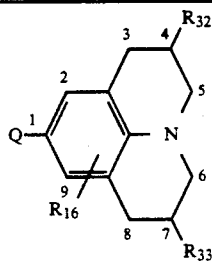

| Entry | Q | R16 | R32 | R33 |
|---|---|---|---|---|
| 1 | H | H | O-2GL/10PO/10EO—H | H |
| 2 | CHO | H | O-4GL/10PO/10EO—H | H |
| 3 | NO | 2-CH3 | O-3GL/10PO/10EO—H | H |
| 4 | NH2 | 2-CH3 | O-5GL/15PO/5EO—H | H |
| 5 | N2+Cl− | 2-CH3 | O-3GL/15BO/6EO—H | H |
| 6 | NH—NH2 | 2-OCH3 | O-4GL/20PO/10EO—H | CH3 |
| 7 | COCH3 | 2-Cl | O-3GL/10PO/20EO—H | CH3 |
| 8 | H | 2-CH3 | O-3GL/10PO/10EO—H | O-3GL/10PO/10EO—H |
| 9 | CHO | 2-OCH3 | O-3GL/20PO/5EO—H | O-3GL/20PO/5EO—H |
| 10 | NO | 2-CH3 | O-2GL/10BO/5EO—H | O-2GL/10BO/5EO—H |
| 11 | NH2 | 2,9-di-CH3 | O-2GL/5BO-2EO—H | OCH3 |
| 12 | N2+Cl− | H | O-3GL/40PO/10EO—H | OCH3 |
| 13 | H | H | O-3GL/40PO/10EO—H | Cl |
| 14 | H | 2-CH3 | O-4GL/8PO/8EO—H | Cl |
| 15 | CHO | 2-CH3 | O-6GL/5PO/10EO—H | H |
| 16 | CHO | 2-CH3 | O-6GL/15PO/5EO—H | O-6GL/15PO/5EO—H |
| 17 | NH2 | H | O-3GL/10PO/10EO—H | H |
| 18 | —N=CH—C6H5 | H | O-3GL/12BO/12EO—H | H |
| 19 | H | H | O-4GL/15PO/15EO—H | Cl |
| 20 | CHO | H | O-3GL/13PO/13EO—H | C2H5 |

TABLE 10 structure: phenyl ring with N(R17)(R18) at position 1, R16 at positions 5/6, Q at position 4

| Entry | Q | $R_{16}$ | $R_{17}$ | $R_{18}$ |
|---|---|---|---|---|
| 1 | H | 3-$CH_3$ | $CH_3$ | 6GL/10PO/10EO—H |
| 2 | H | 3-$CH_3$ | 3-methylphenyl | 2GL/5PO/5EO—H |
| 3 | —C(=O)—H | 3-$OC_2H_5$ | 4-(O-2GL/5PO/5EO—H)phenyl | 4GL/30PO/35EO—H |
| 4 | —C(=O)—H | 3-$C_2H_5$ | $CH(CH_3)C_2H_5$ | 4GL/10PO/15EO—H |
| 5 | —N=O | H | 4-($CO_2C_2H_5$)benzyl | 3GL/10BO/20EO—H |
| 6 | —N=O | H | 3-Cl-benzyl | 6GL/20PO/20EO—H |
| 7 | —$NH_2$ | 3-$CH_2$—O-3GL/10PO/11EO—H | $C_2H_5$ | $C_2H_5$ |
| 8 | —$NH_2$ | 3-O—$C_2H_4$—O-3GL/15BO/18EO—H | $C_2H_5$ | benzyl (—$CH_2$—$C_6H_5$) |

TABLE 10-continued

[Structure: phenyl ring with positions 1-6; position 1 bears N(R17)(R18); position 4 bears Q; position 6 bears R16]

| Entry | Q | R16 | R17 | R18 |
|---|---|---|---|---|
| 9 | —N≡N+Cl− | 3-CH3 | —C2H4—O—C(=O)—C6H5 | 5GL/30PO/70EO—H |
| 10 | —N≡N+Cl− | 3-CH3 | —CH2CH(Cl)CH2Cl | 3GL/22PO/44EO—H |
| 11 | —NH—NH2 | H | —CH2CH2—N(succinimidyl) | 3GL/20BO/30EO—H |
| 12 | —NH—NH2 | H | —CH2CH2—N(hydantoinyl, N—H) | 4GL/10PO/15EO—H |
| 13 | H | H | —CH2CH2—N(thiazolidine-2,4-dione-3-yl) | 3GL/10BO/20EO—H |
| 14 | H | H | —CH2CH2—N(phthalimidyl) | 6GL/20PO/20EO—H |

TABLE 10-continued

Structure: Aniline with substituents — N(R₁₇)(R₁₈) at position 1, R₁₆ at positions 5/6, Q at position 4.

| Entry | Q | R₁₆ | R₁₇ | R₁₈ |
|---|---|---|---|---|
| 15 | H | 3-CH₃ | —CH₂CH₂—N(succinimide-type: O—CH₂—C(=O)—N—C(=O)) | 5GL/10PO/20EO—H |
| 16 | H | 3-CH₃ | —CH₂CH₂—N(saccharin-type: benzisothiazolinone-1,1-dioxide) | 3GL/15PO/15EO—H |
| 17 | H | 3-CH₃ | —CH₂CH₂—N(2-pyrrolidinone) | 2.5GL/20PO/20EO—H |
| 18 | —C(=O)H | 3-CH₃ | —CH₂CH₂—N(isoindolin-1-one) | 3GL/40PO/20EO—H |
| 19 | H | 3-CH₃ | —C₂H₄—N(COCH₃)SO₂CH₃ | 3GL/20PO/25PO—H |
| 20 | —N=O | H | —CH₂—(p-tolyl)—SO₂N(CH₃)—3GL/10PO/11EO—H | C₂H₅ |

TABLE 10-continued structure: Ar-N(R17)(R18) with R16 substituent and Q at position 4

| Entry | Q | R16 | R17 | R18 |
|---|---|---|---|---|
| 21 | —N=O | H | —CH₂—C₆H₄—O-4GL/10PO/10EO—H | CH₃ |
| 22 | H | H | —CH₂C₆H₄SO₂NHC₃H₄-3(O-3GL/10PO/10EO—H) | CH₃ |
| 23 | —N=CH—C₆H₅ | H | —C₆H₄—O-5GL/15PO/15EO—H | CH₃ |
| 24 | O=C—CH₂— | H | —C₆H₄—O—C₂H₄—O-3GL/15PO/15EO—H | CH₃ |
| 25 | O=C—H | H | —C₂H₄—C₆H₄—SO₂-5GL/10PO/10EO—H | CH₃ |
| 26 | —N=O | H | —C₂H₄—N(SO₂CH₃)-3GL/10PO/15EO—H | CH₃ |
| 27 | —NH₂ | 3-CH₃ | —C₂H₄SO₂—N(CH₃)-3GL/10PO/15EO—H | CH₃ |
| 28 | H | H | —CH₂CH₂—S—C(=S)—N(C₆H₄) (benzothiazole-type) | 4GL/15PO/20EO—H |
| 29 | —NH₂ | H | —CH₂CH₂—O-3GL/15PO/15EO—H | C₂H₅ |
| 30 | —NH₂ | H | —CH₂—C₆H₅ | 4GL/20PO/20EO—H |

TABLE 10-continued

Structure: Para-substituted aniline with Q at position 4, R16 at position 3/5, and N(R17)(R18) at position 1.

| Entry | Q | R16 | R17 | R18 |
|---|---|---|---|---|
| 31 | —NH$_2$ | 3-Cl | —C$_2$H$_5$ | -3GL/10BO/10EO—H |
| 32 | —C(O)CH$_2$ | 3-CH$_3$ | —C$_2$H$_8$SO$_2$C$_2$H$_4$—S—CH$_3$ | 4GL/15PO/20EO—H |
| 33 | H | H | —CH$_2$CH$_2$—S-(2-pyridyl) | 3GL/10PO/15EO—H |
| 34 | —C(O)H | H | —CH$_2$CH$_2$SO$_2$CH$_2$CH$_2$—O-(2-pyridyl) | 4GL/15PO/40EO—H |
| 35 | —N=O | H | —CH$_2$CH$_2$—S-(2-(N-NH)pyrimidinyl) | 5GL/10BO/11EO—H |
| 36 | H | H | —CH$_2$CH$_2$—S-(2-pyrimidinyl) | 4GL/15PO/20EO—H |
| 37 | H | H | 4-methylcyclohexyl | 8GL/10PO/12EO—H |
| 38 | —NH$_2$ | H | —CH(CH$_3$)C$_4$H$_9$-n | 10GL/20PO/40EO—H |
| 39 | —C(O)H | H | —CH$_2$CH(CH$_3$)$_2$ | 4GL/10BO/12EO—H |

TABLE 11
Q—Ar—(Z)
| Entry | Q | Ar | Z |
|---|---|---|---|
| 1 | H | 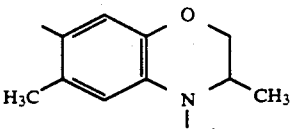 | 3GL/10PO/10EO-H |
| 2 | H | 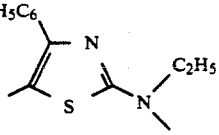 | 4GL/10PO/15EO-H |
| 3 | —C(=O)H |  | 3GL/12PO/15EO-H |
| 4 | H | 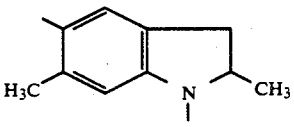 | 4GL/10PO/10EO-H |
| 5 | H | 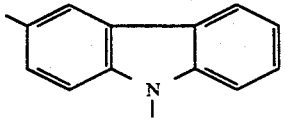 | 3GL/10PO/10EO-H |
| 6 | —N=O | 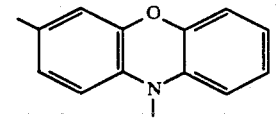 | 3GL/10PO/10EO-H |
| 7 | —C(=O)H |  | 3GL/10PO/10EO-H |
| 8 | H | 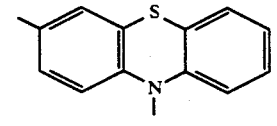 | 5GL/10PO/10EO-H |
| 9 | —C(=O)H |  | 3GL/10PO/15EO-H |

TABLE 11-continued
| Entry | Q | Ar | Z |
|---|---|---|---|
| 10 | H | 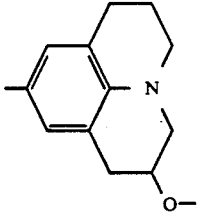 | 3GL/10PO/10EO-H |
| 11 | $-\overset{O}{\underset{\|}{C}}-H$ |  | 3GL/20PO/20EO-H |
| 12 | H | 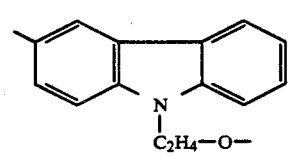 | 3GL/10PO/15EO-H |
| 13 | —N=O | 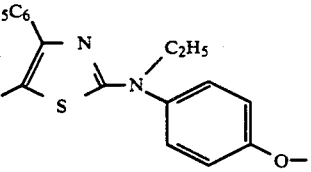 | (2GL/5PO/5EO-H)$_2$ |
| 14 | $-\overset{O}{\underset{\|}{C}}-H$ |  | 4GL/10PO/10EO-H |
| 15 | —N=O | 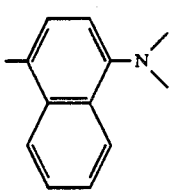 | 5GL/12PO/14EO-H |
| 16 | —NH$_2$ |  | 3GL/10PO/20EO-H |
| 17 | —NH$_2$ | 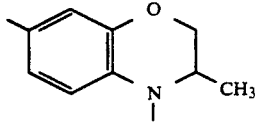 | 6GL/10PO/10EO-H |
| 18 | —NH$_2$ |  | 7GL/10PO/12EO-H |

TABLE 11-continued
| | | Q—Ar—(Z) | |
|---|---|---|---|
| Entry | Q | Ar | Z |
| 19 | —NH₂ | 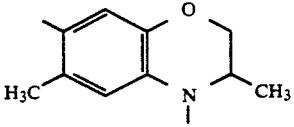 | 3GL/20PO/20EO-H |
| 20 | —N=O | 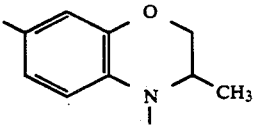 | 3GL/10PO/20EO-H |
| 21 | —NH—NH₂ | 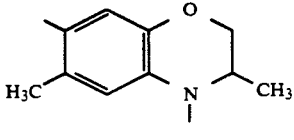 | 2GL/5PO/5EO-H |
| 22 | —N=CH—C₆H₅ | 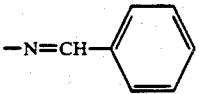 | 3GL/10BO/10EO-H |
| 23 | —CH=N—C₆H₅ | 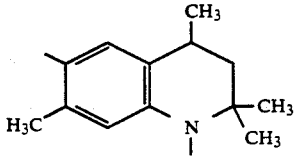 | 4GL/10PO/10EO-H |
| 24 | —NH—NH₂ | 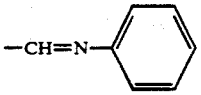 | 3GL/10PO/20EO-H |
| 25 | —C(O)—H | 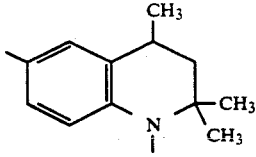 | 6GL/10PO/10EO-H 5EO- |
| 26 | —NH₂ | 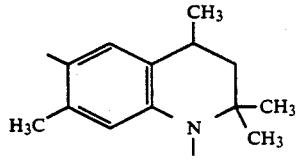 | 3GL/10PO/10EO-H 10PO- |
| 27 | —NH₂ |  | 3GL/20PO/20EO-H 3PO- |

TABLE 11-continued

| Entry | Q | Ar | Z |
|---|---|---|---|
| 28 | —N=O | 2-methyl-phenoxazine with N-CH(CH₃)-, N-3EO- | 3GL/10PO/20EO-H |
| 29 | —NH—NH₂ | dimethyl-phenoxazine with N-CH(CH₃)-, N-EO- | 2GL/5PO/5EO-H |
| 30 | —N=CH—C₆H₅ | dimethyl tetrahydroquinoline with 2,2,4-CH₃, N-2EO- | 3GL/10BO/10EO-H |
| 31 | —CH=N—C₆H₅ | methyl tetrahydroquinoline with 2,2,4-CH₃, N-6EO- | 4GL/10PO/10EO-H |
| 32 | —NH—NH₂ | dimethyl tetrahydroquinoline with 2,2,4-CH₃, N-4EO- | 3GL/10PO/20EO-H |

TABLE 12

Structure: benzene ring numbered 3,4,5,6 with position 2 = X₁, position 1 = N–R₁₇, position 7 = C=O; R₁₆ at position 6, Q₂ at position 3.

| Entry | R₁₇ | R₁₆ | p* | X₁ | Q₂ |
|---|---|---|---|---|---|
| 1 | 3GL/8PO/10EO-H | H | 4 | C=O | H |
| 2 | 3GL/10PO/12EO-H | H | 4 | C=O | NO₂ |
| 3 | 4GL/8PO/8EO-H | H | 4 | C=O | NO₂ |
| 4 | 4GL/10BO/10EO-H | H | 3 | C=O | NH₂ |
| 5 | 3GL/10PO/10EO-H | H | 3 | —S— | NH—NH₂ |
| 6 | 4-[N(2GL/5PO/5EO-H)(2GL/5PO/5EO-H)]phenyl | H | 3 | —S— | N₂⁺Cl⁻ |
| 7 | 4-(O—3GL/8PO/8EO-H)phenyl | H | 4 | —S— | N₂⁺Cl⁻ |

TABLE 12-continued

*Structure: benzisoxazolinone-type ring with R16 at positions 5/6, C=O at 7, N1-R17, X1 at position 2, Q2 at position 3*

| Entry | R17 | R16 | p* | X1 | Q2 |
|---|---|---|---|---|---|
| 8 | 4-[C6H4]-SO2N(H)(3GL/8PO/8EO-H) | 4-CH3 | 3 | C=O | NH2 |
| 9 | 4-[C6H4]-N(1.5GL/4PO/5EO-H)(1.5GL/4PO/5EO-H) | 3,6-di-CH3 | 4 | C=O | NH2 |
| 10 | 3GL/10PO/10EO-H | 3-Cl | 4 | C=O | NH2 |
| 11 | 3GL/10BO/10EO-H | 3-Br | 4 | C=O | —N=CH—C6H5 |
| 12 | 3GL/8PO/12EO-H | 4,5-diCl | 3 | C=O | NH—NH2 |
| 13 | 4GL/20PO/20EO-H | H | 4 | C=O | H |
| 14 | 3GL/20PO/40EO-H | H | 4 | C=O | NO2 | p* indicates position of Q2 on aromatic ring

TABLE 13

*Structure: naphthalimide with R17 on N, C=O at positions 1 and 8, R16 at position 2, Q4 at position 6*

| Entry | R17 | R16 | Q4 |
|---|---|---|---|
| 1 | 3GL/8PO/8EO-H | H | H |
| 2 | 3GL/10PO/10EO-H | 6-OCH3 | 4-NO2 |
| 3 | 3GL/15PO/20EO-H | 5,6-di-CH3 | 4-NO2 |
| 4 | 4GL/10BO/10EO-H | 5,6-di-OC2H5 | 4-NH2 |
| 5 | 3GL/20PO/25EO-H | 5,6-di-C6H5 | 4-NH2 |
| 6 | 5GL/10PO/10EO-H | 5-S—C6H5 | 4-N2+Cl− |
| 7 | 4-[C6H4]-O-3GL/8PO/8EO-H | 6-S-[C6H4]-4-Cl | 4-NH—NH2 |
| 8 | 4-[C6H4]-N(2GL/5PO/5EO-H)(2GL/5PO/5EO-H) | 5,6-di-SC2H5 | 4-NH—NH2 |
| 9 | 4-[C6H4]-SO2N(H)(3GL/10PO/10EO-H) | 6-NHCOCH3 | 5-NH—NH2 |
| 10 | 3-[C6H4]-N(2GL/4PO/5EO-H)(2GL/4PO/5EO-H) | 5-NHCOC5H11 | 5-NO2 |

TABLE 13-continued

| Entry | R₁₇ | R₁₆ | Q₄ |
|---|---|---|---|
| 11 | (3-methylphenyl)-O—20EO-18PO/10EO-H | 5-NHCO$_2$C$_2$H$_5$ | 4-NO$_2$ |
| 12 | 5GL/10PO/2DEO-H | 6-NHSO$_2$-n-C$_4$H$_9$ | 4-NH$_2$ |
| 13 | —CH$_2$—(phenyl)—SO$_2$N(H)-3GL/8PO/12EO-H | 5- (dimethoxy-triazinyl-NH) | 4-NH$_2$ |

We claim:

1. A compound having the formula $$Y{-}(Z)_{1-6}$$

wherein Y is the residue of a reactant selected from: anilines; 1,2,3,4-tetrahydroquinolines; 3,4-dihydro-2H-1,4-benzoxazines; 2-aminothiazoles; indoles; 2,3-dihydroindoles; carbazoles; naphthylamines; phenoxazines; phenothiazines; diphenylamines; julolidines; 2-aminothiophenes; and aminopyridines, and each Z is a poly(oxyalkylene) moiety having a glycidol segment containing one or more glycidol residues, provided that said compound comprises at least two of said glycidol residues, and wherein a primary oxy site of said glycidol segment is linked directly to a first epoxide segment containing at least one residue of an epoxide of three or more carbons, wherein in said first epoxide segment said epoxide residue of three or more carbons is either directly linked to said glycidol segment at said primary oxy site or is positioned in said segment within ten epoxide residues of said primary oxy site, said first epoxide segment being linked through a secondary oxy site directly to a second epoxide segment containing at least one epoxide residue having a primary terminal hydroxyl, and wherein a secondary hydroxyl of said glycidol segment is linked directly to a third epoxide segment having a primary terminal hydroxyl.

2. A compound according to claim 1 wherein each Z moiety has a molecular weight of from about 200 to about 10,000.

3. A compound according to claim 2 wherein said glycidol segment is linked directly to a nitrogen linked directly to an aromatic compound.

4. A compound according to claim 2 wherein said glycidol segment is connected directly to an aromatic compound through or by an oxy, thio, sulfinyl, sulfonamido or imido linkage.

5. A compound according to claim 4 wherein each Z moiety contains in close proximity to said aromatic compound a segment of at least two linked glycidol residues, which segment has been reacted with propylene oxide or butylene oxide in stoichiometric excess of the glycidol residue hydroxyl sites, and wherein the resultant product has been reacted with ethylene oxide reactant to provide at least two terminal —CH$_2$CH$_2$OH groups.

6. A compound according to claim 4 wherein said first epoxide segment contains a total of from about 2 to about 15 residues of propylene oxide, butylene oxide or mixtures thereof, and said second epoxide segment and said third epoxide segment each contain from about 2 to about 50 residues of ethylene oxide.

7. A compound having the formula $$Y{-}(Z)_{1-6}$$

wherein Y is the residue of a reactant selected from: anilines; 1,2,3,4-tetrahydroquinolines; 3,4-dihydro-2H-1,4-benzoxazines; 2-aminothiazoles; indoles; 2,3-dihydroindoles; carbazoles; naphthylamines; phenoxazines; phenothiazines; diphenylamines; julolidines; 2-aminothiophenes; and aminopyridines, and each Z is a poly(oxyalkylene) moiety having a glycidol segment containing one or more glycidol residues, provided that said compound comprises at least three of said glycidol residues, said glycidol segment comprising a primary oxy site and a secondary oxy site, said poly(oxyalkylene) moiety having secondary hydroxyl forming epoxide residues linked to said primary and secondary oxy sites, and each of said secondary hydroxyl forming epoxide residues are terminated with an epoxide residue having a primary hydroxyl.

8. A compound according to claim 7 wherein said poly(oxyalkylene) moiety is connected directly to an aromatic compound through or by an oxy, thio, sulfinyl, sulfonamido or imido linkage.

9. A compound according to claim 7 wherein said secondary hydroxyl forming epoxide residue is a residue of propylene oxide or butylene oxide.

10. A compound according to claim 8 wherein said secondary hydroxyl forming epoxide residue is terminated with a residue of ethylene oxide.

11. A compound according to claim 8 wherein said secondary hydroxyl forming epoxide residue is terminated with a plurality of residues of ethylene oxide.

12. A compound according to claim 11 wherein said glycidol segment is connected directly to an aromatic compound through or by an oxy, thio, sulfinyl, sulfonamido or imido linkage and the number of poly(oxyalkylene) moieties is one or two.

* * * * *